(12) United States Patent
Berliner et al.

(10) Patent No.: US 11,464,051 B2
(45) Date of Patent: Oct. 4, 2022

(54) APERIODIC RANDOM ACCESS PROCEDURES

(71) Applicant: QUALCOMM Incorporated, San Diego, CA (US)

(72) Inventors: Ran Berliner, Kfar-Aviv (IL); Yehonatan Dallal, Kfar Saba (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 17/084,842

(22) Filed: Oct. 30, 2020

(65) Prior Publication Data

US 2022/0141875 A1 May 5, 2022

(51) Int. Cl.
*H04W 74/08* (2009.01)
*H04W 76/19* (2018.01)
*H04W 76/11* (2018.01)
*H04B 7/06* (2006.01)
*H04W 24/08* (2009.01)
(Continued)

(52) U.S. Cl.
CPC ...... *H04W 74/0833* (2013.01); *H04B 7/0695* (2013.01); *H04W 24/08* (2013.01); *H04W 56/001* (2013.01); *H04W 72/042* (2013.01); *H04W 72/0446* (2013.01); *H04W 74/006* (2013.01); *H04W 74/008* (2013.01); *H04W 76/11* (2018.02); *H04W 76/19* (2018.02)

(58) Field of Classification Search
CPC ............ H04W 74/0833; H04W 24/08; H04W 56/001; H04W 72/042; H04W 72/0446; H04W 74/006; H04W 74/008; H04W 76/11; H04B 7/0695
See application file for complete search history.

(56) References Cited

U.S. PATENT DOCUMENTS

| 2012/0275390 A1* | 11/2012 | Korhonen | ........... H04W 74/006 370/329 |
| 2013/0188612 A1* | 7/2013 | Dinan | ............... H04W 72/0486 370/336 |

(Continued)

OTHER PUBLICATIONS

International Search Report and Written Opinion—PCT/US2021/053186—ISA/EPO—dated Jan. 31, 2022.
(Continued)

*Primary Examiner* — Jael M Ulysse
(74) *Attorney, Agent, or Firm* — Holland & Hart LLP

(57) ABSTRACT

Methods, systems, and devices for wireless communications are described to support scheduling aperiodic random access occasion resources. The aperiodic random access occasion resources may be dynamically scheduled by a primary secondary cell (PSCell) associated with a base station. When performing a random access procedure for the PSCell, the base station may initiate the random access procedure via an order transmitted to a user equipment (UE). The order may represent a unicast transmission addressed to the UE and may indicate for the UE to transmit a preamble to begin the random access procedure. The order may also indicate resources (e.g., an offset of time resources) and a preamble index for transmission of the preamble. The UE may receive the order and may transmit the preamble based on the information included in the order.

30 Claims, 17 Drawing Sheets

(51) Int. Cl.
*H04W 56/00* (2009.01)
*H04W 72/04* (2009.01)
*H04W 74/00* (2009.01)

(56) References Cited

U.S. PATENT DOCUMENTS

| | | | | |
|---|---|---|---|---|
| 2013/0188618 A1* | 7/2013 | Dinan | ............... | H04W 56/0005 370/336 |
| 2013/0195030 A1* | 8/2013 | Wittberg | ............ | H04W 74/006 370/329 |
| 2015/0333879 A1* | 11/2015 | Yang | ................ | H04W 74/0833 370/337 |
| 2018/0152906 A1* | 5/2018 | Kim | .................. | H04W 56/0005 |
| 2018/0279186 A1* | 9/2018 | Park | .................. | H04W 36/0077 |
| 2019/0052339 A1* | 2/2019 | Zhou | .................. | H04W 52/40 |
| 2019/0069258 A1* | 2/2019 | Jeon | ................. | H04W 56/0045 |
| 2019/0150107 A1* | 5/2019 | Tang | ...................... | F01D 11/02 370/329 |
| 2019/0182800 A1* | 6/2019 | Park | ......................... | H04B 7/06 |
| 2019/0215870 A1* | 7/2019 | Babaei | ................. | H04W 24/10 |
| 2019/0253941 A1* | 8/2019 | Cirik | ................ | H04W 36/0077 |
| 2019/0327769 A1* | 10/2019 | Yang | .................. | H04W 72/046 |
| 2020/0052769 A1* | 2/2020 | Cirik | .................... | H04L 1/0026 |
| 2020/0107369 A1* | 4/2020 | Jeon | ...................... | H04W 72/14 |
| 2020/0137821 A1* | 4/2020 | Cirik | ..................... | H04B 7/063 |
| 2020/0221504 A1* | 7/2020 | Cirik | ..................... | H04W 72/04 |
| 2020/0229157 A1* | 7/2020 | Rastegardoost | .... | H04W 72/042 |
| 2020/0296635 A1* | 9/2020 | Rastegardoost | ...... | H04L 5/0048 |
| 2020/0314917 A1* | 10/2020 | Jeon | ..................... | H04W 74/08 |
| 2020/0350973 A1* | 11/2020 | Cirik | ................ | H04W 72/1284 |
| 2020/0351955 A1* | 11/2020 | Jeon | .................... | H04L 5/0053 |
| 2021/0250990 A1* | 8/2021 | Kong | .................. | H04L 1/0061 |
| 2022/0078856 A1* | 3/2022 | Jeon | ................. | H04W 74/0841 |

OTHER PUBLICATIONS

NTT Docomo., et al., "Enhancements to Initial Access Procedure for NR-U", 3GPP TSG RAN WG1 #97, 3GPP Draft, R1-1906198_ Enhancements to Initial Access Procedure for NR-U_Final, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051727652, Retrieved from the Internet: URL: https://www.3gpp.org/ftp/tsg_ran/WG1_RL1/ TSGR1_97/Docs, [retrieved on May 13, 2019], Section 4, p. 8-p. 9.

* cited by examiner

APERIODIC RANDOM ACCESS PROCEDURES

FIELD OF TECHNOLOGY

The present disclosure relates to wireless communications, including aperiodic random access procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, resources configured semi-statically for communications between a UE and a base station, such as random access resources, may increase resource overhead and increase a communication latency.

SUMMARY

The described techniques relate to improved methods, systems, devices, and apparatuses that support aperiodic random access procedures. Generally, the described techniques provide for scheduling aperiodic random access occasion resources. The aperiodic random access occasion resources may be scheduled (e.g., dynamically scheduled) by a primary secondary cell (PSCell) associated with a base station. For example, when performing a random access procedure for the PSCell (e.g., for initial transmission timing adjustments or uplink synchronization), the base station may initiate the random access procedure via a transmitted order, such as physical downlink control channel (PDCCH) order. The PDCCH order may represent a unicast transmission addressed to a user equipment (UE) (e.g., intended for the UE) and may indicate for the UE to transmit a preamble to begin the random access procedure. The PDCCH order may also indicate resources (e.g., time and/or frequency resources) and a preamble index for transmission of the preamble. For example, the PDCCH order may indicate an explicit timing (e.g., an offset of a number of time resources, such as slots or symbols) from the reception of the PDCCH order to the transmission of the preamble. The UE may receive the PDCCH order and may transmit the preamble (e.g., to begin the random access procedure) based on the information included in the PDCCH order (e.g., based on the scheduled resources and the preamble index).

A method of wireless communication at a UE is described. The method may include receiving, from a secondary cell (SCell) of a base station in a first time resource, an indication of an offset and a random access identifier (ID) for the UE, the offset including a quantity of time resources and scheduling a random access occasion for the UE to transmit a preamble of a random access procedure for the SCell, determining, based on the received indication of the offset, a second time resource that is offset from the first time resource by the quantity of time resources, and transmitting, to the SCell, the preamble of the random access procedure in the second time resource, the preamble based on the indicated random access ID.

An apparatus for wireless communication at a UE is described. The apparatus may include a processor, memory coupled with the processor, and instructions stored in the memory. The instructions may be executable by the processor to cause the apparatus to receive, from a SCell of a base station in a first time resource, an indication of an offset and a random access ID for the UE, the offset including a quantity of time resources and scheduling a random access occasion for the UE to transmit a preamble of a random access procedure for the SCell, determine, based on the received indication of the offset, a second time resource that is offset from the first time resource by the quantity of time resources, and transmit, to the SCell, the preamble of the random access procedure in the second time resource, the preamble based on the indicated random access ID.

Another apparatus for wireless communication at a UE is described. The apparatus may include means for receiving, from a SCell of a base station in a first time resource, an indication of an offset and a random access ID for the UE, the offset including a quantity of time resources and scheduling a random access occasion for the UE to transmit a preamble of a random access procedure for the SCell, determining, based on the received indication of the offset, a second time resource that is offset from the first time resource by the quantity of time resources, and transmitting, to the SCell, the preamble of the random access procedure in the second time resource, the preamble based on the indicated random access ID.

A non-transitory computer-readable medium storing code for wireless communication at a UE is described. The code may include instructions executable by a processor to receive, from a SCell of a base station in a first time resource, an indication of an offset and a random access ID for the UE, the offset including a quantity of time resources and scheduling a random access occasion for the UE to transmit a preamble of a random access procedure for the SCell, determine, based on the received indication of the offset, a second time resource that is offset from the first time resource by the quantity of time resources, and transmit, to the SCell, the preamble of the random access procedure in the second time resource, the preamble based on the indicated random access ID.

In some examples of the method, apparatuses, and non-transitory computer-readable medium described herein, receiving the indication of the offset and the random access ID may include operations, features, means, or instructions for receiving a message indicating that the UE may be to perform the random access procedure for the SCell, where the indication of the offset and the random access ID may be received in the message.

In some examples of the method, apparatuses, and non-transitory computer-readable medium described herein, receiving the message may include operations, features, means, or instructions for receiving a downlink control information (DCI) message indicating the UE may be to perform the random access procedure for the SCell and including the indication of the offset and the random access ID.

Some examples of the method, apparatuses, and non-transitory computer-readable medium described herein may further include operations, features, means, or instructions for monitoring for a response to the transmitted preamble of the random access procedure during a monitoring time duration that may be based on the received indication of the offset.

Some examples of the method, apparatuses, and non-transitory computer-readable medium described herein may further include operations, features, means, or instructions for receiving one or more SSBs (SSBs) from the SCell, transmitting, to the primary cell, an indication of a SSB selected from the one or more SSBs of the SCell, and monitoring, on the SCell, for the indication of the offset and the random access ID for the UE based on transmitting the indication of the SSB, the indication of the offset and the random access ID for the UE received in response to the monitoring.

Some examples of the method, apparatuses, and non-transitory computer-readable medium described herein may further include operations, features, means, or instructions for receiving, from the primary cell, a configuration of the SCell, and monitoring, at least in part in response to receiving the configuration, for the one or more SSBs from the SCell, where the random access procedure includes a timing adjustment procedure for the SCell.

In some examples of the method, apparatuses, and non-transitory computer-readable medium described herein, monitoring for the indication of the offset may include operations, features, means, or instructions for monitoring for the indication of the offset and random access ID for the UE according to a radio network temporary identifier (RNTI) of the UE that may be associated with a SCell group that includes the SCell.

In some examples of the method, apparatuses, and non-transitory computer-readable medium described herein, the one or more SSBs may be received from the SCell, and the indication of the SSB may be transmitted to the primary cell.

Some examples of the method, apparatuses, and non-transitory computer-readable medium described herein may further include operations, features, means, or instructions for transmitting, to a primary cell, a link recovery request based on detecting a beam failure for a PSCell associated with the base station, receiving, from the primary cell, an indication of uplink resources on the primary cell for performing a beam failure recovery (BFR) procedure for the PSCell, transmitting, to the primary cell on the uplink resources, a request of the BFR procedure, and receiving, from the primary cell in response to the request of the BFR procedure, an indication of a communication beam of the PSCell.

In some examples of the method, apparatuses, and non-transitory computer-readable medium described herein, the indication of the offset may be received via a unicast transmission from the base station.

Some examples of the method, apparatuses, and non-transitory computer-readable medium described herein may further include operations, features, means, or instructions for receiving a configuration scheduling a periodic set of random access occasions for the UE to transmit a preamble of the random access procedure for a primary cell, the random access occasion for the UE to transmit the preamble of the random access procedure for the SCell different from each random access occasion of the periodic set of random access occasions for the UE to transmit the preamble of the random access procedure for the primary cell.

In some examples of the method, apparatuses, and non-transitory computer-readable medium described herein, the SCell includes a PSCell of a SCell group associated with the base station.

In some examples of the method, apparatuses, and non-transitory computer-readable medium described herein, the first time resource may be a first slot and the second time resource may be a second slot.

In some examples of the method, apparatuses, and non-transitory computer-readable medium described herein, the first time resource may be a first symbol period and the second time resource may be a second symbol period.

A method of wireless communication at a base station is described. The method may include transmitting, to a UE from a SCell in a first time resource, an indication of an offset and a random access ID for the UE, the offset including a quantity of time resources and scheduling a random access occasion for the UE to transmit a preamble of a random access procedure for the SCell, monitoring, based on the transmitted indication of the offset, a second time resource that is offset from the first time resource by the quantity of time resources, and receiving, from the UE on the SCell based on the monitoring and the indicated random access ID, the preamble of the random access procedure in the second time resource.

An apparatus for wireless communication at a base station is described. The apparatus may include a processor, memory coupled with the processor, and instructions stored in the memory. The instructions may be executable by the processor to cause the apparatus to transmit, to a UE from a SCell in a first time resource, an indication of an offset and a random access ID for the UE, the offset including a quantity of time resources and scheduling a random access occasion for the UE to transmit a preamble of a random access procedure for the SCell, monitor, based on the transmitted indication of the offset, a second time resource that is offset from the first time resource by the quantity of time resources, and receive, from the UE on the SCell based on the monitoring and the indicated random access ID, the preamble of the random access procedure in the second time resource.

Another apparatus for wireless communication at a base station is described. The apparatus may include means for transmitting, to a UE from a SCell in a first time resource, an indication of an offset and a random access ID for the UE, the offset including a quantity of time resources and scheduling a random access occasion for the UE to transmit a preamble of a random access procedure for the SCell, monitoring, based on the transmitted indication of the offset, a second time resource that is offset from the first time resource by the quantity of time resources, and receiving, from the UE on the SCell based on the monitoring and the indicated random access ID, the preamble of the random access procedure in the second time resource.

A non-transitory computer-readable medium storing code for wireless communication at a base station is described. The code may include instructions executable by a processor to transmit, to a UE from a SCell in a first time resource, an indication of an offset and a random access ID for the UE, the offset including a quantity of time resources and scheduling a random access occasion for the UE to transmit a preamble of a random access procedure for the SCell, monitor, based on the transmitted indication of the offset, a second time resource that is offset from the first time resource by the quantity of time resources, and receive, from the UE on the SCell based on the monitoring and the indicated random access ID, the preamble of the random access procedure in the second time resource.

In some examples of the method, apparatuses, and non-transitory computer-readable medium described herein, transmitting the indication of the offset and the random access ID may include operations, features, means, or instructions for transmitting a message indicating that the UE may be to perform the random access procedure for the SCell, where the indication of the offset and the random access ID may be received in the message.

In some examples of the method, apparatuses, and non-transitory computer-readable medium described herein, transmitting the message may include operations, features, means, or instructions for transmitting a DCI message indicating the UE may be to perform the random access procedure for the SCell and including the indication of the offset and the random access ID.

Some examples of the method, apparatuses, and non-transitory computer-readable medium described herein may further include operations, features, means, or instructions for transmitting a response to the received preamble of the random access procedure during a monitoring time duration that may be based on the transmitted indication of the offset.

Some examples of the method, apparatuses, and non-transitory computer-readable medium described herein may further include operations, features, means, or instructions for transmitting one or more SSBs from the SCell, and receiving, on a primary cell, an indication of a SSB of the one or more SSBs, where the indication of the offset and the random access ID for the UE may be transmitted on the SCell based on receiving the indication of the SSB.

Some examples of the method, apparatuses, and non-transitory computer-readable medium described herein may further include operations, features, means, or instructions for receiving, from the UE on a primary cell, a link recovery request for a PSCell associated with the base station, transmitting, to the UE on the primary cell, an indication of uplink resources on the primary cell for the UE to use to perform a BFR procedure for the PSCell, receiving, from the UE on the primary cell on the uplink resources, a request of the BFR procedure, and transmitting, to the UE on the primary cell in response to the request of the BFR procedure, an indication of a communication beam of the PSCell.

In some examples of the method, apparatuses, and non-transitory computer-readable medium described herein, the indication of the offset may be transmitted via a unicast transmission to the UE.

Some examples of the method, apparatuses, and non-transitory computer-readable medium described herein may further include operations, features, means, or instructions for transmitting a configuration scheduling a periodic set of random access occasions for the UE to use to transmit a preamble of the random access procedure for a primary cell, the random access occasion for the UE to use to transmit the preamble of the random access procedure for the SCell different from each random access occasion of the periodic set of random access occasions for the UE to use to transmit the preamble of the random access procedure for the primary cell.

DETAILED DESCRIPTION

Figure 1:
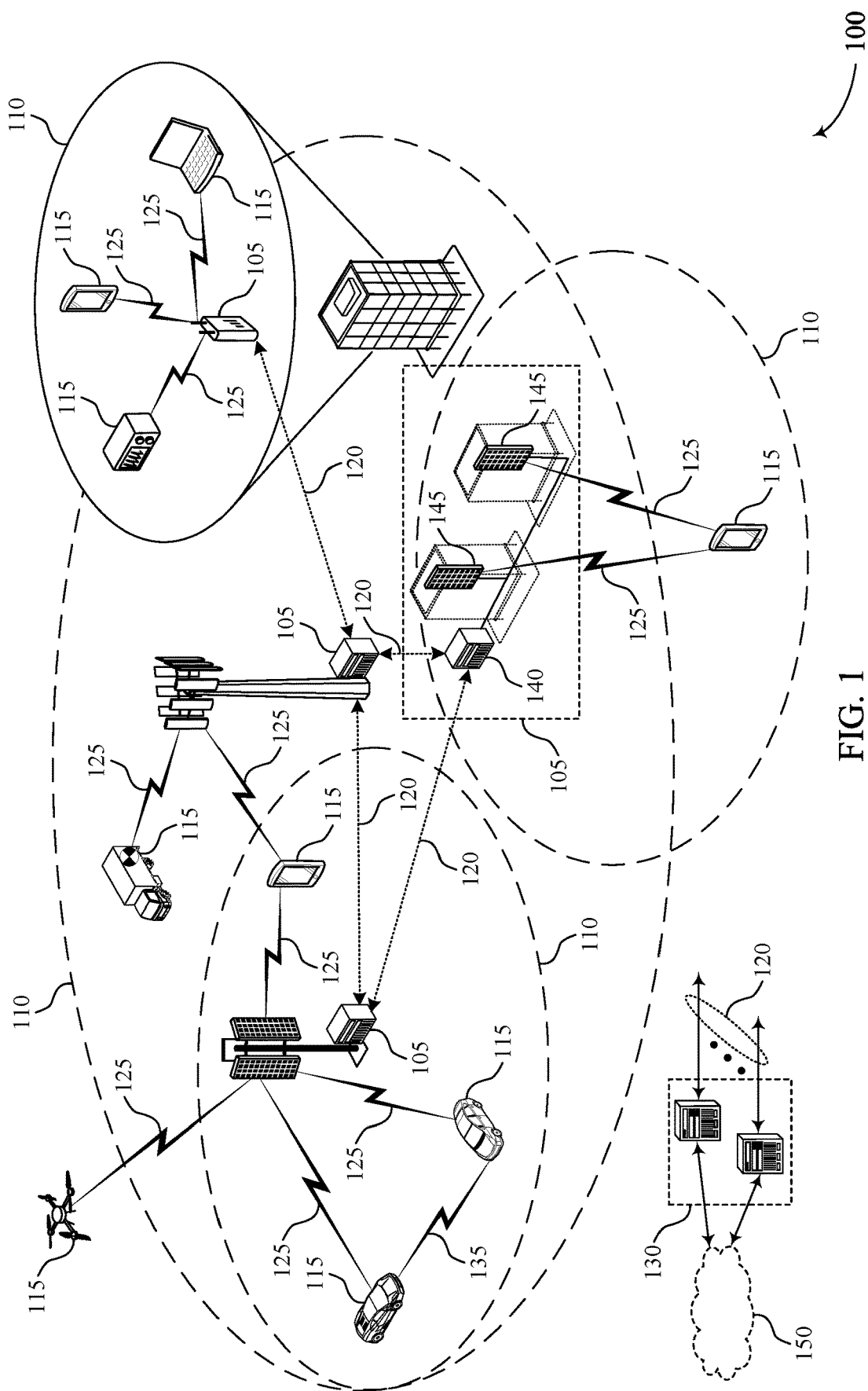
FIG. 1 illustrates an example of a wireless communications system that supports aperiodic random access procedures in accordance with aspects of the present disclosure.

A user equipment (UE) may communicate with one or more base stations within a wireless communications system. In some cases, a first base station may include or house a primary cell (PCell) for uplink communications with the UE, and a second base station may include or house a primary secondary cell (PSCell) for uplink communications with the UE. The UE may be configured with carrier aggregation or dual connectivity using the PCell and the PSCell. While operations are described herein with reference to a PCell and a PSCell associated with different base stations, the same operations may apply to a PCell and a PSCell associated with a same base station without departing from the scope of the present disclosure. A PSCell as described herein may include or represent a PSCell of, or associated with, a secondary cell group associated with a base station (e.g., the second base station).

The UE may communicate with the first or second base station, in some cases, by performing one or more random access procedures with the first or second base station. The UE may select a beam for transmitting a random access preamble of a random access procedure for the PSCell, where the beam selected by the UE may be associated with a synchronization signal block (SSB) configured for one or more random access occasions (e.g., time and frequency resources for transmission of the preamble). For example, the UE may be provided a number of SSBs (e.g., N SSBs) associated with a random access occasion and a number of preambles (e.g., R contention based premables) per SSB for the random access occasion.

The resources for random access occasions (e.g., for transmitting the preamble) may repeat periodically, for example, according to a defined periodicity. The amount of resources for the random access occasions (e.g., based on the mapping of the SSBs and random access occasions) may, in some cases, result in higher overhead for the network. Additionally, the repetition of the random access occasions according to the defined periodicity may introduce latency to random access communications between the UE and the second base station (e.g., because the UE may wait up to the defined periodicity to transmit the preamble).

The present disclosure provides techniques for reducing overhead and latency associated with random access transmissions by supporting aperiodic random access occasion resources that may be scheduled (e.g., dynamically scheduled) by the second base station (e.g., the PSCell). Such aperiodic random access occasions may replace (e.g., partially or entirely) the otherwise periodic random access occasions associated with the PSCell or other cells, which may reduce latency and resource overhead associated with random access procedures for the PSCell (e.g., by dynamically scheduling the random access occasion).

For example, when performing initial transmission timing adjustments or uplink synchronization, the second base station may initiate the associated random access procedure via a transmitted order, such as physical downlink control channel (PDCCH) order. The PDCCH order may represent a unicast transmission addressed to the UE (e.g., intended for the UE) and may indicate for the UE to transmit the preamble to begin the random access procedure. The PDCCH order may also indicate resources (e.g., time and/or frequency resources) and a preamble index for transmission of the preamble. For example, the PDCCH order may indicate an explicit timing (e.g., a number of time resources, such as slots or symbols) from the reception of the PDCCH order to the transmission of the preamble.

The UE may receive the PDCCH order and may transmit the preamble (e.g., to begin the random access procedure) based on the information included in the PDCCH order (e.g., based on the scheduled resources and the preamble index). Such aperiodic random access occasions may reduce (e.g., eliminate) transmission collisions for preambles, for example, based on allocating or assigning the preamble index via the PDCCH order. Receiver complexity at the second base station may also be reduced based on the knowledge of the random access preamble index and associated SSB, as well as based on the scheduled resources for reception of the preamble. The reduction in collisions and receiver complexity for the preamble may further result in higher probability of success of the associated random access procedure.

Aspects of the disclosure are initially described in the context of wireless communications systems. Aspects of the disclosure are further illustrated by and described with reference to process flows, apparatus diagrams, system diagrams, and flowcharts that relate to aperiodic random access procedures.

FIG. 1 illustrates an example of a wireless communications system 100 that supports aperiodic random access procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, a first base station 105 of wireless communications system 100 may include or house a PCell for uplink communications with a UE 115, and a second base station 105 may include or house a PSCell for uplink communications with the UE 115. The UE 115 may communicate with the first or second base station 105, in some cases, by performing one or more random access procedures with the first or second base station 105. The resources for random access occasions (e.g., for transmitting a preamble) may repeat periodically, for example, according to a defined periodicity. The amount of resources for the random access occasions may, in some cases, result in higher overhead for the network. Additionally, the repetition of the random access occasions according to the defined periodicity may introduce latency to random access communications between the UE 115 and the second base station 105 (e.g., because the UE 115 may wait up to the defined periodicity to transmit the preamble).

The present disclosure provides techniques for reducing overhead and latency associated with random access transmissions by supporting aperiodic random access occasion resources that may be scheduled (e.g., dynamically scheduled) by the second base station 105 (e.g., the PSCell). Such aperiodic random access occasions may replace (e.g., partially or entirely) the otherwise periodic random access occasions associated with the PSCell or other cells, which may reduce latency and resource overhead associated with random access procedures for the PSCell (e.g., by dynamically scheduling the random access occasion). For example, when performing initial transmission timing adjustments or uplink synchronization, the second base station 105 may initiate the associated random access procedure via a transmitted order, such as a PDCCH order. The PDCCH order may indicate resources (e.g., time and/or frequency resources) and a preamble index for transmission of the preamble. The UE 115 may receive the PDCCH order and may transmit the preamble (e.g., to begin the random access procedure) based on the information included in the PDCCH order (e.g., based on the scheduled resources and the preamble index).

Figure 2:
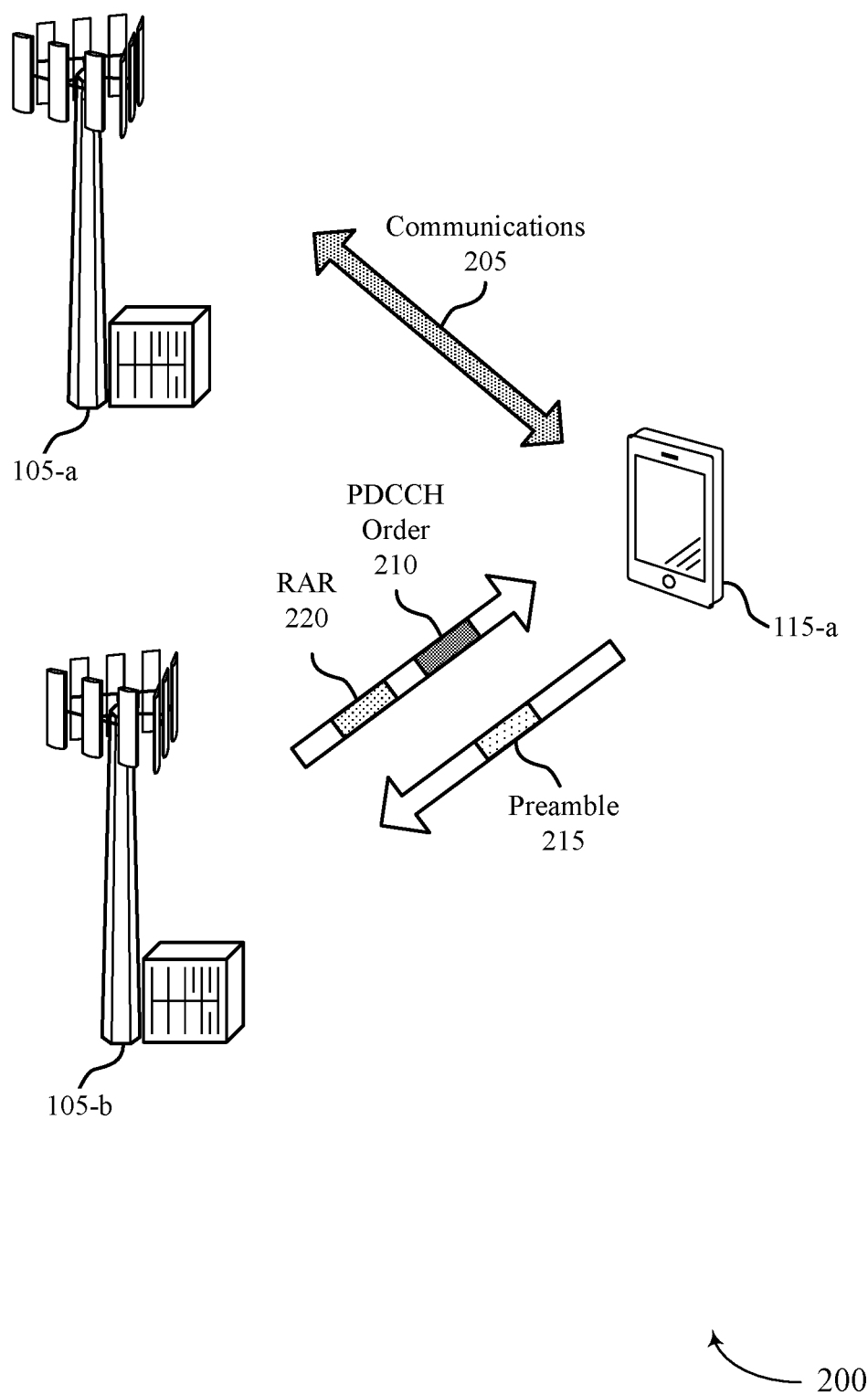
FIG. 2 illustrates an example of a wireless communications system that supports aperiodic random access procedures in accordance with aspects of the present disclosure.

FIG. 2 illustrates an example of a wireless communications system 200 that supports aperiodic random access procedures in accordance with aspects of the present disclosure. In some examples, wireless communications system 200 may implement aspects of wireless communications system 100. For example, wireless communications system 200 may include base stations 105-*a* and 105-*b* and a UE 115-*a*, which may be examples of base stations 105 and a UE 115 described with reference to FIG. 1. In some cases, base station 105-*a* may include or house a PCell for uplink communications with UE 115-*a* (e.g., a PCell with an uplink configuration carrier for UE 115-*a*), and base station 105-*b* may include or house a PSCell for uplink communications with UE 115-*a* (e.g., a PSCell with an uplink configuration carrier for UE 115-*a*). For example, UE 115-*a* may be configured with carrier aggregation or dual connectivity (e.g., E-UTRA NR dual connectivity (EN-DC)) using the PCell and the PSCell.

While the operations described herein reference a PCell and a PSCell associated with different base stations 105, the same operations may apply to a PCell and a PSCell associated with a same base station 105 without departing from the scope of the present disclosure. A PSCell as described herein may include or represent a PSCell of or associated with a secondary cell group associated with a base station (e.g., base station 105-*b*).

UE 115-*a* may communicate with base station 105-*a* or 105-*b*, in some cases, by performing one or more random access procedures with base station 105-*a* or 105-*b*. For example, UE 115-*a* may perform a random access procedure with the PCell (e.g., with base station 105-*a*) to perform connection establishment (e.g., establish an initial connection with base station 105-*a*), perform connection reestablishment (e.g., establish a connection with base station 105-*a* after radio link failure), or request on-demand system information (e.g., which may trigger broadcasting of system information, such as information other than a system information block 1 (SIB1)). In some cases, communications 205 may represent one or more portions of such a random access procedure.

UE 115-*a* may additionally or alternatively perform a random access procedure with the PSCell (e.g., with base station 105-*b*) to perform initial transmission timing adjustments (e.g., following a handover, such as a timing advance group (TAG) initial time alignment), perform beam failure recovery (BFR) (e.g., may signal base station 105-*b* to move to a better beam, which may be considered radio link failure), or perform uplink synchronization (e.g., as initiated by base station 105-*b* via an order, such as a PDCCH order). In some cases, UE 115-*a* may also communicate with one or more other secondary cells (SCells) associated with the PSCell (e.g., the secondary cell group) and with base station 105-*b*. The one or more other SCells may or may not be associated with the random access procedure performed via the PSCell, for example, based on inheriting timing from the PSCell or based on one or more configurations for the one or more SCells.

In order to perform a random access procedure (e.g., a layer 1 (L1) random access procedure) on the PSCell, UE 115-*a* may transmit a random access preamble 215 (e.g., a message 1 (msg1)), via a physical random access channel (PRACH), to the PSCell (e.g., to base station 105-*b*). The PSCell (e.g., base station 105-*b*) may response with a random access response (RAR) 220 to UE 115-*a*, which may include a control channel and data channel transmission (e.g., a PDCCH and physical downlink shared channel (PDSCH), such as a message 2 (msg2)). The RAR 220 may include a grant scheduling an uplink transmission (e.g., via a physical uplink shared channel (PUSCH)) for UE 115-a, where transmission of the uplink transmission may finish the random access procedure.

UE 115-a may select a beam for transmitting the random access preamble 215, where the beam may be associated with overcoming mmW propagation loss (e.g., using narrow, directional analog beams associated with beam acquisition and tracking signals), for example, based on using mmW carriers for throughput enhancement. The propagation loss may occur in a frequency range 2 (FR2), frequency range 4 (FR4), or a frequency range 5 (FR5), where the propagation loss (e.g., and an associated beam narrowness) may increase for higher frequency ranges. In some cases, such frequency ranges may be limited to PSCell and/or SCell transmissions (e.g., may exclude PCell transmissions), for example, based on a lower mobility resiliency, a lower cell coverage, and a beam management complexity (e.g., a complexity of selecting a beam for random access procedures) associated with these frequency ranges.

The beam selected by UE 115-a for transmitting the random access preamble 215 may be associated with an SSB configured for one or more random access occasions (e.g., time and frequency resources for transmission of the preamble 215). For example, UE 115-a may be provided a number of SSBs (e.g., N SSBs) associated with a random access occasion and a number of preambles (e.g., R contention based premables) per SSB for the random access occasion. UE 115-a may receive an indication of the SSBs and the preambles via configuration signaling (e.g., via a parameter ssb-perRACH-OccasionAndCBPreambles-PerSSB). One SSB may be mapped to one random access occasion (e.g., N=1), one SSB may be mapped to multiple random access occasions (e.g., N<1), or multiple SSBs may be mapped to one random access occasion (e.g., N>1). UE 115-a may select an SSB, an associated preamble, and an associated random access occasion for transmitting the random access preamble 215, where the SSB may be associated with the selected beam.

If one SSB is mapped to multiple random access occasions (e.g., 1/N consecutive, valid random access occasions), the SSB may be associated with a total amount of preambles for the random access occasions. For example, the SSB may be associated with two random access occasions (e.g., or more) and may be associated with 64 preambles for each occasion (e.g., R=64, where R may represent contention based preambles with consecutive indexes and starting at a preamble index 0). Similarly, if one SSB is mapped to one random access occasion, the SSB may be associated with a total amount of preambles (e.g., $N_{total\_preamble}$, which may be provided by a parameter totalNumberOfRA-Preambles and may be a multiple of N) for the random access occasion (e.g., R=64). If multiple SSBs are mapped to one random access occasion, each SSB may be associated with a fraction (e.g., $N_{total\_preamble}/N$) of the preambles associated with the random access occasion. In such cases, an SSB n (e.g., where 0≤n≤N−1) may begin to be associated with preambles beginning at a preamble index $n \cdot N_{total\_preamble}/N$.

SSB indexes may be mapped to valid random access occasions in an increasing order of preamble indexes within a single occasion, then in increasing order of frequency resource indexes for frequency multiplexed random access occasions, then in increasing order of time resource indexes for time multiplexed random access occasions (e.g., within a random access TTI, such as a slot), then in increasing order of indexes for random access TTIs (e.g., slots). The PSCell (e.g., base station 105-b) may determine the beam UE 115-a selects for the preamble 215 based on the mapping between the SSBs and the random access occasions.

The resources for random access occasions (e.g., for transmitting the preamble 215) may repeat periodically, for example, according to a defined periodicity (e.g., 160 ms, which may represent a maximum period between random access occasions). The amount of resources for the random access occasions (e.g., based on the mapping of the SSBs and random access occasions) may, in some cases, increase an amount of overhead for the network. Additionally, the repetition of the random access occasions according to the defined periodicity may introduce latency to random access communications between UE 115-a and base station 105-b (e.g., because UE 115-a may have to wait up to the defined periodicity to transmit the preamble 215).

The present disclosure provides techniques for reducing overhead and latency with random access transmissions by supporting aperiodic random access occasion resources that may be scheduled (e.g., dynamically scheduled) by base station 105-b (e.g., via the PSCell or another SCell). Such aperiodic random access occasions may replace (e.g., partially or entirely) the otherwise periodic random access occasions associated with the PSCell or other SCells, which may reduce latency and resource overhead associated with random access procedures for the PSCell or the other SCells (e.g., by dynamically scheduling the random access occasion).

For example, when performing initial transmission timing adjustments or uplink synchronization, base station 105-b may initiate the associated random access procedure via a transmitted order, such as a PDCCH order 210. The PDCCH order 210 may represent a unicast transmission addressed to UE 115-a (e.g., intended for UE 115-a) and may indicate for UE 115-a to transmit the preamble 215 to begin the random access procedure. The PDCCH order 210 may also indicate resources (e.g., time and/or frequency resources) and a preamble index for transmission of the preamble 215. For example, the PDCCH order 210 may indicate an explicit timing or offset (e.g., a number of time resources, such as slots or symbols) from the reception of the PDCCH order 210 to the transmission of the preamble 215.

UE 115-a may receive the PDCCH order 210 and may transmit the preamble 215 (e.g., to begin the random access procedure) based on the information included in the PDCCH order 210 (e.g., based on the scheduled resources and the preamble index). The PSCell (e.g., base station 105-b) may receive the preamble 215 and may transmit the RAR 220 in response, where a RAR window for transmitting the RAR 220 may be based on (e.g., relative to) the scheduled resources for transmission of the preamble 215. Where the RAR window is based on the scheduled resources for transmission of the preamble 215, UE 115-a may monitor for the RAR during the RAR window and based on the scheduled resources for transmission of the preamble 215.

Such aperiodic random access occasions may reduce (e.g., eliminate) transmission collisions for preambles 215, for example, based on allocating or assigning the preamble index (e.g., assigning a random access preamble index (RAPID)) via the PDCCH order 210. Receiver complexity at base station 105-b may also be reduced based on the knowledge of the random access preamble index and associated SSB (e.g., associated with beam and quasi co-location (QCL) information), as well as based on the scheduled resources for reception of the preamble 215. The reduction in collisions and receiver complexity for the preamble 215 may further result in higher probability of success of the associated random access procedure.

In the case of performing the random access procedure for an initial timing adjustment for the PSCell, UE 115-a may select an SSB (e.g., and associated beam) for the random access procedure (e.g., for transmission of the preamble 215) and may transmit an indication of the selected SSB to the PCell. In such cases, communications 205 may include the indication of the selected SSB. The PCell may indicate the SSB (e.g., beam) to the PSCell, and the PSCell may select the preamble index for the PDCCH order 210 based on the indicated SSB.

In some cases, a random access procedure for BFR on the PSCell may be replaced with a link recovery request (LRR) transmitted to the PCell (e.g., base station 105-a), which may further reduce an amount of overhead on the PSCell associated with random access resources. For example, UE 115-a may detect beam failure on the PSCell and may transmit an LRR to the PCell (e.g., base station 105-a), which may initiate a BFR procedure between UE 115-a and the PCell. In such cases, communications 205 may include the LRR, as well as communications associated with the BFR procedure (e.g., an uplink resource grant for UE 115-a, a BFR request from UE 115-a, and a BFR response from the PCell).

Figure 3:
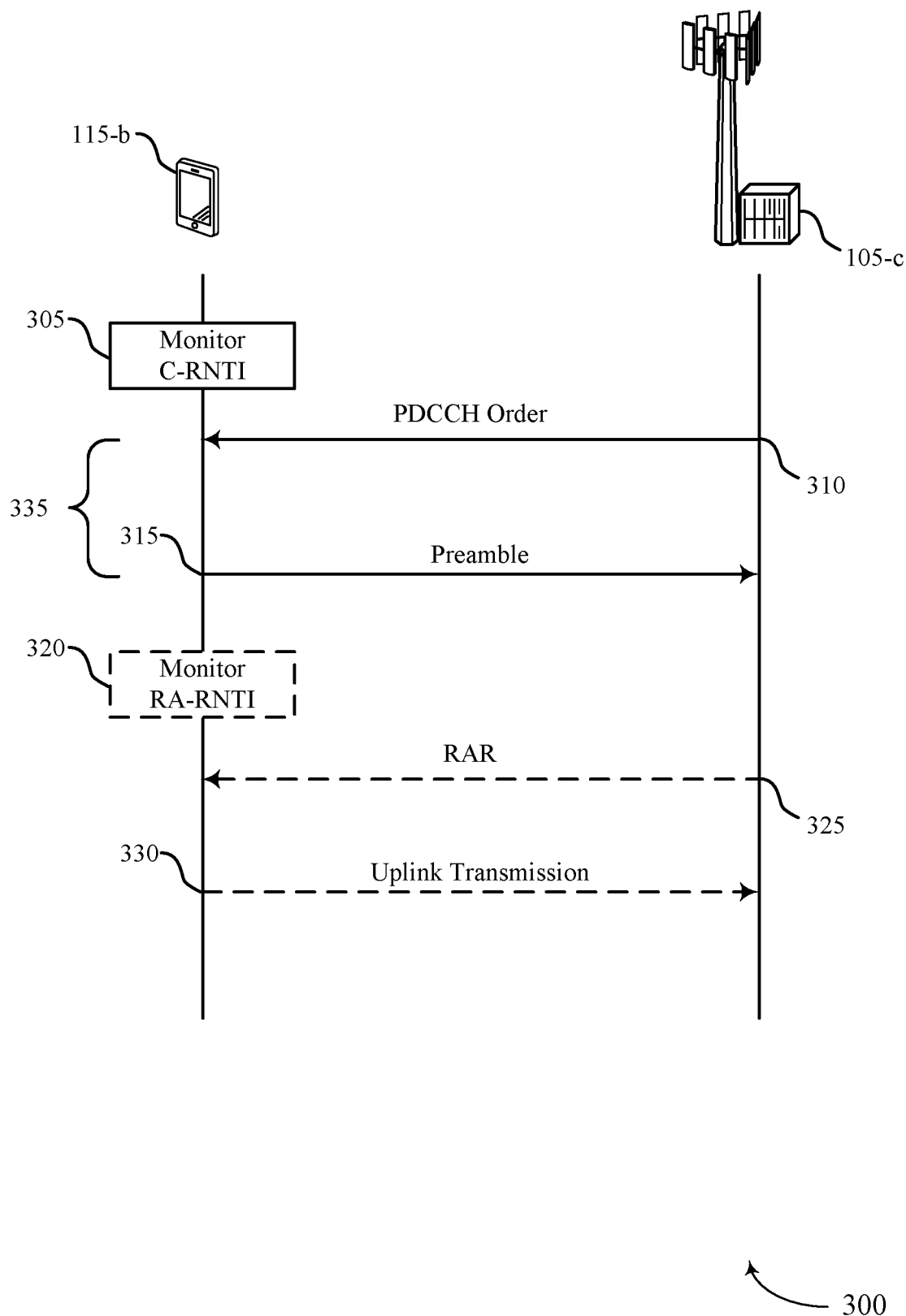
FIG. 3 illustrates an example of a process flow that supports aperiodic random access procedures in accordance with aspects of the present disclosure.

FIG. 3 illustrates an example of a process flow 300 that supports aperiodic random access procedures in accordance with aspects of the present disclosure. In some examples, process flow 300 may implement or be implemented by aspects of wireless communications system 100 or 200. For example, process flow 300 may be implemented by a UE 115-b and a base station 105-c, which may represent examples of a UE 115 and a base station 105 described with reference to FIGS. 1 and 2. Base station 105-c may, for example, include or house a PSCell or an SCell as described with reference to FIG. 2. Base station 105-c and UE 115-b may implement portions of process flow 300 to perform an aperiodic random access procedure, as described with reference to FIG. 2. The aperiodic random access procedure may, for example, be associated with uplink synchronization for base station 105-c (e.g., for the PSCell or the SCell).

In the following description of process flow 300, the operations between UE 115-b and base station 105-c may be transmitted in a different order than the order shown, or the operations performed by UE 115-b and base station 105-c may be performed in different orders or at different times. For example, specific operations may also be left out of process flow 300, or other operations may be added to process flow 300. Although UE 115-b and base station 105-c are shown performing the operations of process flow 300, some aspects of some operations may also be performed by one or more other wireless devices. For example, some aspects of process flow 300 may be performed by a PCell or an SCell (e.g., associated with base station 105-c or another base station 105), among other examples.

At 305, UE 115-b may monitor a radio network temporary identifier (RNTI) associated with UE 115-b, such as a cell RNTI (C-RNTI). For example, UE 115-b may monitor a control channel (e.g., a PDCCH) for a control message (e.g., a downlink control information (DCI)) addressed to the C-RNTI of UE 115-b. The RNTI (e.g., C-RNTI) associated with the UE 115-b may be associated with a secondary cell group that includes the PSCell or the SCell.

At 310, base station 105-c (e.g., the PSCell or the SCell) may transmit, to UE 115-b and in a first time resource, an indication of an offset 335 and a random access identifier (ID) for UE 115-b (e.g., a RAPID). For example, base station 105-c may transmit an order, such as a PDCCH order, to UE 115-b. Base station 105-c may transmit the PDCCH order via a control message (e.g., a DCI, such as a DCI format 1_0) on the control channel (e.g., PDCCH), where the control message may be addressed to the C-RNTI of UE 115-b. The offset 335 may include a quantity of time resources (e.g., slots or symbols) and may schedule a random access occasion for UE 115-b to transmit a preamble of the random access procedure for the SCell.

The PDCCH order may include an explicit indication of scheduled resources (e.g., a number of slots or symbols from the PDCCH order) for the random access preamble transmission from UE 115-b to base station 105-c. The PDCCH order may also include an indication of a preamble index for the preamble transmission, for example, by indicating a RAPID for the random access procedure. In some cases, the PDCCH order may also include one or more other aspects, such as an indication for UE 115-b to perform the random access procedure or an indication of a RAR window, among other examples.

At 315, UE 115-b may transmit, to base station 105-c (e.g., the PSCell or the SCell), the preamble of the random access procedure. For example, UE 115-b may determine, based on the received indication of the offset 335, a second time resource that is offset from the first time resource by the quantity of time resources. For example, offset 335 may represent the quantity of time resources (e.g., number of slots or symbols) between the first time resource and the second time resource. UE 115-b may transmit the preamble of the random access procedure in the second time resource. The preamble may be based on the indicated random access ID (e.g., the RAPID or preamble index). For example, UE 115-b may transmit a preamble associated with a preamble index that may be indicated by the random access ID (e.g., RAPID). UE 115-b may use the allocated RAPID for transmission of the preamble for the random access procedure.

At 320, UE 115-b may monitor a random access RNTI (RA-RNTI) associated with UE 115-b, for example, based on transmitting the preamble at 315. The RA-RNTI may be based on or associated with the preamble, preamble index, RAPID, or random access occasion (e.g., time and/or frequency resources) used by UE 115-b for transmission of the preamble at 315.

At 325, base station 105-c (e.g., the PSCell or the SCell) may transmit a RAR to UE 115-b, for example, in response to reception of the preamble. The RAR may represent a control and data transmission (e.g., via PDCCH and PDSCH, respectively) that is addressed to the RA-RNTI of UE 115-b. The RAR may include the random access ID (e.g., RAPID included in a medium access control (MAC) sub protocol data unit (PDU)), a timing advance command, and a grant of uplink resources for UE 115-b (e.g., for completion of the random access procedure). The timing advance command may, for example, be used by UE 115-b to perform the uplink synchronization associated with the random access procedure (e.g., because the random access procedure may be performed to complete uplink synchronization). Once UE 115-b successfully decodes the RAR (e.g., the PDCCH and PDSCH communication addressed to the RA-RNTI), the random access procedure may be considered completed (e.g., successful).

At 330, UE 115-b may transmit, to base station 105-c (e.g., the PSCell or the SCell), an uplink transmission. The uplink transmission may be based on information received by UE 115-*b* via the RAR. For example, the uplink transmission may use the resources indicated by the RAR and may be based on the timing advance command indicated by the RAR.

Figure 4:
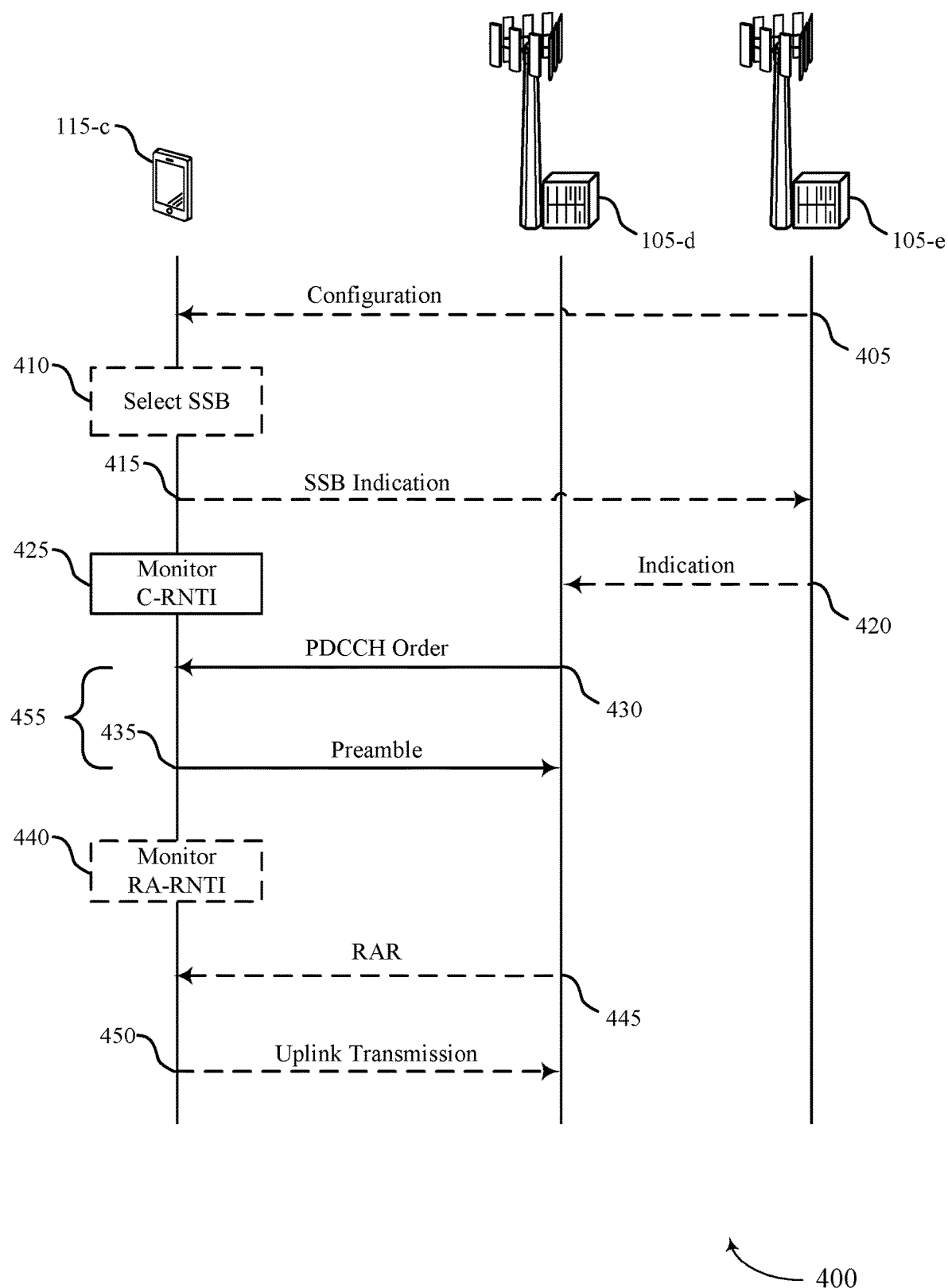
FIG. 4 illustrates an example of a process flow that supports aperiodic random access procedures in accordance with aspects of the present disclosure.

FIG. 4 illustrates an example of a process flow 400 that supports aperiodic random access procedures in accordance with aspects of the present disclosure. In some examples, process flow 400 may implement aspects of wireless communications system 100 or 200. For example, process flow 400 may be implemented by a UE 115-*c* and base stations 105-*d* and 105-*e*, which may represent examples of a UE 115 and base stations 105 described with reference to FIGS. 1-3. Base station 105-*d* may, for example, include or house a PSCell or an SCell and base station 105-*e* may include or house a PCell, as described with reference to FIGS. 2 and 3. Base station 105-*d*, base station 105-*e*, and UE 115-*c* may implement portions of process flow 400 to perform an aperiodic random access procedure, as described with reference to FIG. 2. The aperiodic random access procedure may, for example, be associated with an initial transmission timing adjustment for base station 105-*d* (e.g., for the PSCell or the SCell).

In the following description of process flow 400, the operations between UE 115-*c*, base station 105-*d*, and base station 105-*e* may be transmitted in a different order than the order shown, or the operations performed by UE 115-*c*, base station 105-*d*, and base station 105-*e* may be performed in different orders or at different times. For example, specific operations may also be left out of process flow 400, or other operations may be added to process flow 400. Although UE 115-*c*, base station 105-*d*, and base station 105-*e* are shown performing the operations of process flow 400, some aspects of some operations may also be performed by one or more other wireless devices. For example, some aspects of process flow 400 described as being performed by a PSCell may be performed by a PCell or an SCell (e.g., associated with base station 105-*d* or another base station 105), among other examples.

At 405, base station 105-*e* (e.g., the PCell) may transmit a configuration (e.g., a radio resource control (RRC) configuration) to UE 115-*c*. The configuration may configure UE 115-*c* with information or parameters associated with the PSCell (e.g., base station 105-*d*), such as one or more beams or SSBs associated with the PSCell. The configuration may, in some cases, be referred to as a PSCell configuration, because the configuration may configure the PSCell for UE 115-*c*.

At 410, UE 115-*c* may select an SSB for performing the random access procedure, for example, based on one or more SSBs configured for the PSCell via the configuration. UE 115-*c* may establish the PSCell carrier (e.g., based on the configuration) and may search for an SSB (e.g., a beam) for the random access procedure. For example, UE 115-*c* may search for and select an SSB that may be suitable for the random access procedure (e.g., based on one or more characteristics of the SSB, random access communications, or both). UE 115-*c* may search for and select the SSB by monitoring the SSBs (e.g., the configured SSBs) of the PSCell (e.g., base station 105-*d*). UE 115-*c* may monitor the SSBs to find a best beam (e.g., based on the one or more characteristics), which may represent an SSB (e.g., beam) on which UE 115-*c* may camp and which UE 115-*c* may use for the random access procedure (e.g., to transmit a random access preamble).

At 415, UE 115-*c* may transmit, to the PCell (e.g., base station 105-*e*), an indication of the selected SSB (e.g., PSCell SSB) for the random access procedure. For example, UE 115-*c* may transmit the indication of the selected SSB to the PCell via a dedicated MAC CE or other dedicated report, among other examples.

At 420, base station 105-*e* (e.g., the PCell) may transmit, to base station 105-*d* (e.g., the PSCell), an indication of the SSB selected by UE 115-*c*. For example, base station 105-*e* may transmit the indication via the core network, via a backhaul network, via a wireless backhaul network, or any combination thereof.

At 425, UE 115-*c* may monitor the PSCell (e.g., base station 105-*d*) for a control message (e.g., a PDCCH order transmitted via DCI) addressed to a RNTI (e.g., C-RNTI) of UE 115-*c*. For example, UE 115-*c* may monitor for the C-RNTI (e.g., on a control channel, such as a PDCCH) based on transmitting the indication of the selected SSB, in order to receive a PDCCH order from base station 105-*d*. Monitoring for the C-RNTI may include camping on or monitoring the selected SSB (e.g., beam) of the PSCell. The RNTI (e.g., C-RNTI) associated with the UE 115-*b* may be associated with a secondary cell group that includes the PSCell or the SCell.

At 430, base station 105-*d* (e.g., the PSCell) may transmit, to UE 115-*c* and in a first time resource, an indication of an offset 455 and a random access ID for UE 115-*c* (e.g., a RAPID). For example, base station 105-*d* may transmit an order, such as a PDCCH order, to UE 115-*c*. Base station 105-*d* may transmit the PDCCH order via a control message (e.g., a DCI, such as a DCI format 1_0) on a control channel (e.g., a PDCCH), where the control message may be addressed to the C-RNTI of UE 115-*c*. The offset 455 may include a quantity of time resources (e.g., slots or symbols) and may schedule a random access occasion for UE 115-*c* to transmit a preamble of the random access procedure for the PSCell.

The PDCCH order may include an explicit indication of scheduled resources (e.g., a number of slots or symbols from the PDCCH order) for a random access preamble transmission from UE 115-*c* to base station 105-*d*. The PDCCH order may also include an indication of a preamble index for the preamble transmission, for example, by indicating a RAPID for the random access procedure. In some cases, the PDCCH order may also include one or more other aspects, such as an indication for UE 115-*c* to perform the random access procedure or an indication of a RAR window, among other examples.

At 435, UE 115-*c* may transmit, to base station 105-*d* (e.g., the PSCell), the preamble of the random access procedure. For example, UE 115-*c* may determine, based on the received indication of the offset 455, a second time resource that is offset from the first time resource by the quantity of time resources. For example, offset 455 may represent the quantity of time resources (e.g., number of slots or symbols). UE 115-*c* may transmit the preamble of the random access procedure in the second time resource. The preamble may be based on the indicated random access ID (e.g., the RAPID or preamble index). For example, UE 115-*c* may transmit a preamble associated with a preamble index that may be indicated by the random access ID (e.g., RAPID). UE 115-*c* may use the allocated RAPID for transmission of the preamble for the random access procedure.

At 440, UE 115-*c* may monitor an RA-RNTI associated with UE 115-*c*, for example, based on transmitting the preamble at 435. The RA-RNTI may be based on or associated with the preamble, preamble index, RAPID, or random access occasion (e.g., time and/or frequency resources) used by UE 115-*c* for transmission of the preamble at 435.

At 445, base station 105-*d* (e.g., the PSCell) may transmit a RAR to UE 115-*c*, for example, in response to reception of the preamble. The RAR may represent a control and data transmission (e.g., via PDCCH and PDSCH, respectively) that is addressed to the RA-RNTI of UE 115-*c*. The RAR may include the random access ID (e.g., RAPID included in a MAC subPDU), a timing advance command, and a grant of uplink resources for UE 115-*c* (e.g., for completion of the random access procedure). The timing advance command may, for example, be used by UE 115-*c* to perform the initial transmission timing adjustments associated with the random access procedure (e.g., because the random access procedure may be performed to complete the initial transmission timing adjustments). Once UE 115-*c* successfully decodes the RAR (e.g., the PDCCH and PDSCH communication addressed to the RA-RNTI), the random access procedure may be considered completed (e.g., successful).

At 450, UE 115-*c* may transmit, to base station 105-*d* (e.g., the PSCell), an uplink transmission. The uplink transmission may be based on information received by UE 115-*c* via the RAR. For example, the uplink transmission may use the resources indicated by the RAR and may be based on the timing advance command indicated by the RAR.

Figure 5:
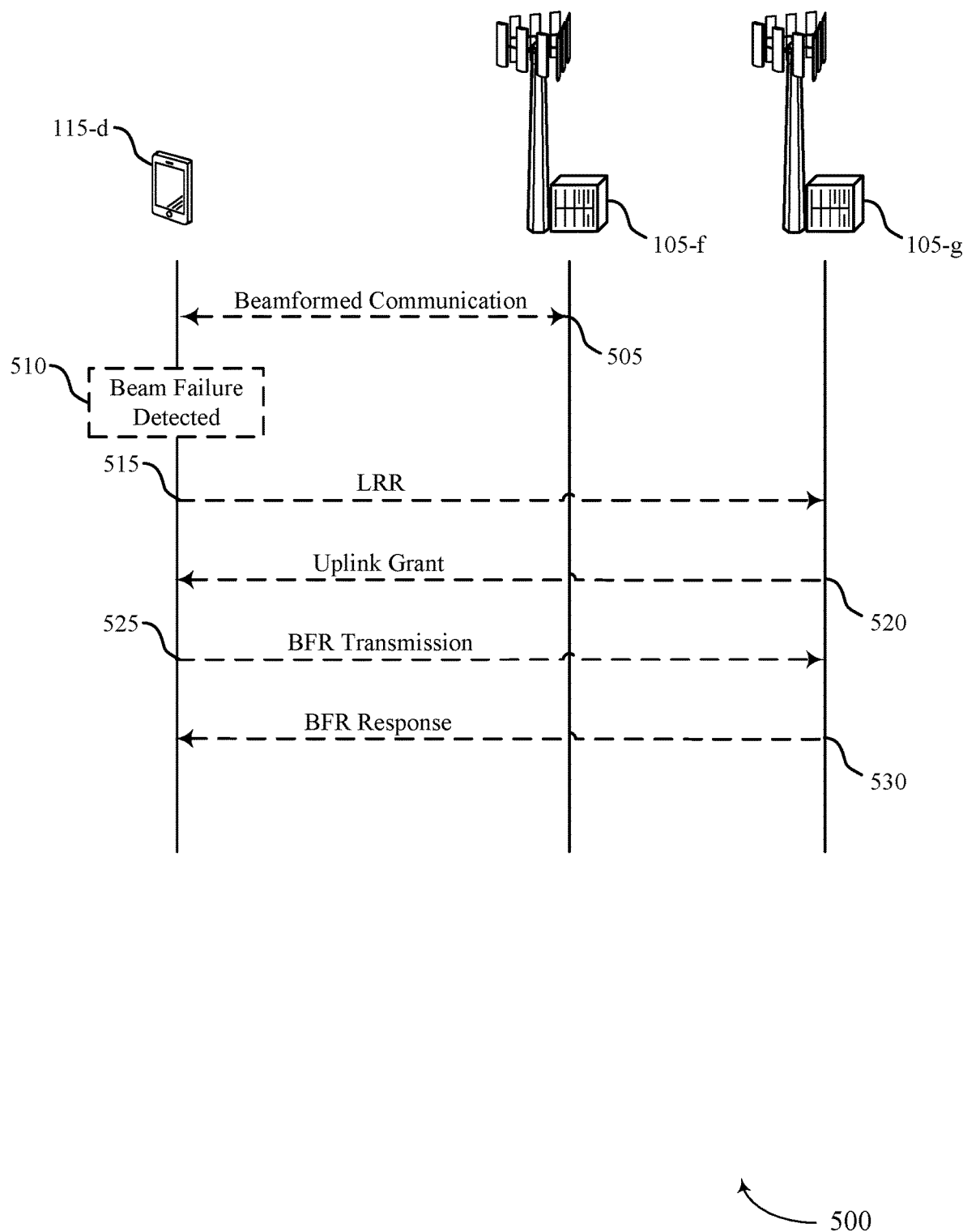
FIG. 5 illustrates an example of a process flow that supports aperiodic random access procedures in accordance with aspects of the present disclosure.

FIG. 5 illustrates an example of a process flow 500 that supports aperiodic random access procedures in accordance with aspects of the present disclosure. In some examples, process flow 500 may implement aspects of wireless communications system 100 or 200. For example, process flow 500 may be implemented by a UE 115-*d* and base stations 105-*f* and 105-*g*, which may represent examples of a UE 115 and base stations 105 described with reference to FIGS. 1-4. Base station 105-*f* may, for example, include or house a PSCell or an SCell and base station 105-*g* may include or house a PCell, as described with reference to FIGS. 2-4. Base station 105-*f*, base station 105-*g*, and UE 115-*d* may implement portions of process flow 500 to perform a BFR procedure (e.g., in place of a random access procedure associated with BFR), as described with reference to FIG. 2. The BFR procedure may, for example, be associated with a beam failure for a communication beam associated with communications between UE 115-*d* and base station 105-*f* (e.g., the PSCell or the SCell).

In the following description of process flow 500, the operations between UE 115-*d*, base station 105-*f*, and base station 105-*g* may be transmitted in a different order than the order shown, or the operations performed by UE 115-*d*, base station 105-*f*, and base station 105-*g* may be performed in different orders or at different times. For example, specific operations may also be left out of process flow 500, or other operations may be added to process flow 500. Although UE 115-*d*, base station 105-*f*, and base station 105-*g* are shown performing the operations of process flow 500, some aspects of some operations may also be performed by one or more other wireless devices. For example, some aspects of process flow 500 described as being performed by a PSCell may be performed by a PCell or an SCell (e.g., associated with base station 105-*f* or another base station 105), among other examples.

In some cases described herein, the SCell associated with base station 105-*f* may communicate with UE 115-*d* may communicate using FR2, FR4, FR5, or any combination thereof. The SCell may be associated with downlink communications for UE 115-*d*, or both downlink and uplink communications for UE 115-*d*. The PSCell associated with base station 105-*f* may also communicate with UE 115-*d* using FR2, FR4, FR5, or any combination thereof. The PCell associated with base station 105-*g* may communicate with UE 115-*d* using a frequency range 1 (FR1), FR2, or both.

At 505, base station 105-*f* (e.g., the PSCell) and UE 115-*d* may communicate a beamformed communication (e.g., an uplink or downlink communication). The beamformed communication may experience at least some beam failure, for example, based on a communication environment, a noise level, one or more beam parameters, or any combination thereof, among other examples. The beam failure may reduce a communication quality of the beamformed communication, and in some cases, the beam failure may result in a failure to receive the beamformed communication at a receiving device.

At 510, UE 115-*d* may detect the beam failure between UE 115-*d* and base station 105-*f* (e.g., the PSCell), for example, based on one or more beam failure detection (BFD) procedures for UE 115-*d*. The one or more BFD procedures may be stored at UE 115-*d* or may be configured by a base station 105 (e.g., base station 105-*f* or 105-*g*). The one or more BFD procedure may include identifying a noise level, an error level, a communication accuracy, or any combination thereof, associated with the beamformed communication (e.g., among other beamformed communications).

At 515, UE 115-*d* may transmit an LRR to base station 105-*g* (e.g., the PCell) based on detecting the beam failure at 510. The LRR may include a scheduling request or a MAC CE, for example, as defined by a wireless communications standard. The LRR may request to perform a BFR procedure based on the detection of the beam failure, or may request uplink resources to transmit a BFR transmission, among other examples.

At 520, base station 105-*g* (e.g., the PCell) may transmit, to UE 115-*d*, a grant of resources for an uplink transmission for the BFR procedure. Base station 105-*g* may transmit the grant based on the received LRR and may, in some cases, indicate that the resources for the uplink transmission are associated with the BFR procedure or are associated with a BFR transmission.

At 525, UE 115-*d* may transmit a BFR transmission to base station 105-*g* (e.g., the PCell), where the BFR transmission may initiate a BFR procedure for the PSCell. The BFR transmission may represent a MAC CE or other signaling configured for initiating the BFR procedure (e.g., as specified by a wireless communications standard) and signaled via an uplink data channel (e.g., PUSCH) for the PCell. The BFR transmission may indicate one or more beams or techniques for fixing the beam failure between UE 115-*d* and the PSCell (e.g., base station 105-*f*) and may request performance of the BFR procedure.

At 530, base station 105-*g* (e.g., the PCell) may transmit, to UE 115-*d*, a BFR response, for example, as part of the BFR procedure (e.g., to complete the BFR procedure). The BFR response may, for example, indicate a new beam to use for communications between UE 115-*d* and base station 105-*f* (e.g., the PSCell), or may indicate one or more actions to take to fix the beam failure between UE 115-*d* and the PSCell, among other examples.

The techniques described herein to communicate an LRR and associated BFR communications may, in some cases, be based on or be similar to a BFR procedure performed for beam failure on an SCell (e.g., of base station 105-*f*). For example, an LRR and associated BFR procedure for an SCell may be communicated with a PSCell associated with the SCell, and the techniques described herein may be similar to such an LRR and BFR procedure, with the techniques being performed by communicating with a PCell for beam failure detected on a PSCell.

As described with reference to FIG. 2, the techniques for performing the BFR procedure for the PSCell by communicating with the PCell may be used, in some cases, to replace a random access procedure associated with BFR for the PSCell. In some cases, the PCell may have a higher probability of completing the BFR procedure (e.g., receiving the BFR transmission and responding to the BFR transmission) than when performing the BFR procedure via a random access procedure with the PSCell. For example, if the PCell is associated with a lower frequency band, the BFR transmission may be more likely to be received. In a first example, the PCell may be associated with FR1 and the PSCell may be associated with FR2, and in a second example, the PCell may be associated with FR1 or FR2 and the PSCell may be associated with FR4.

Figure 6:
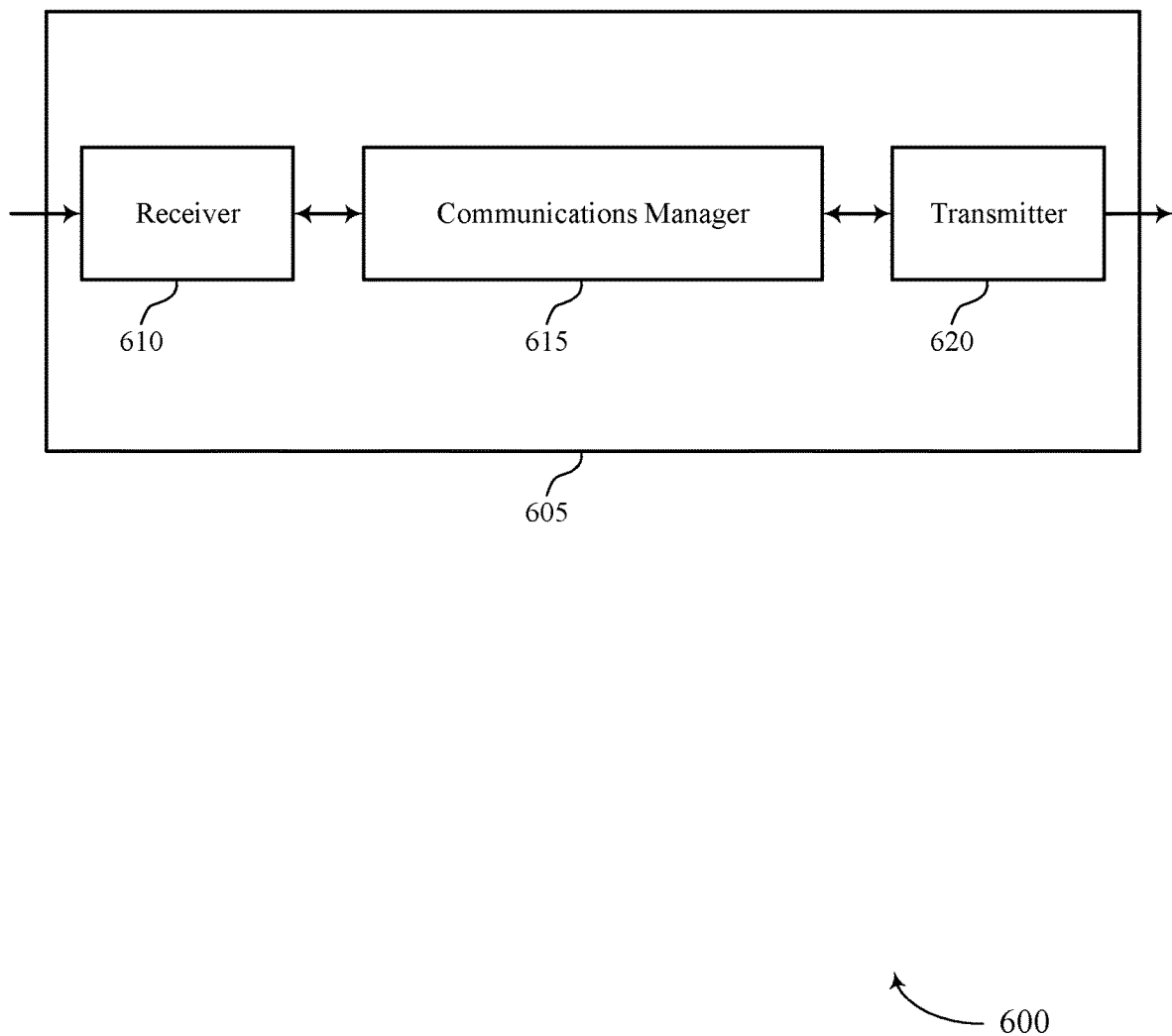
FIGS. 6 and 7 show block diagrams of devices that support aperiodic random access procedures in accordance with aspects of the present disclosure.

FIG. 6 shows a block diagram 600 of a device 605 that supports aperiodic random access procedures in accordance with aspects of the present disclosure. The device 605 may be an example of aspects of a UE 115 as described herein. The device 605 may include a receiver 610, a communications manager 615, and a transmitter 620. The device 605 may also include one or more processors, memory coupled with the one or more processors, and instructions stored in the memory that are executable by the one or more processors to enable the one or more processors to perform the aperiodic random access procedures discussed herein. Each of these components may be in communication with one another (e.g., via one or more buses).

The receiver 610 may receive information such as packets, user data, or control information associated with various information channels (e.g., control channels, data channels, and information related to aperiodic random access procedures, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from an SCell of a base station in a first time resource, an indication of an offset and a random access ID for the UE, the offset including a quantity of time resources and scheduling a random access occasion for the UE to transmit a preamble of a random access procedure for the SCell, determine, based on the received indication of the offset, a second time resource that is offset from the first time resource by the quantity of time resources, and transmit, to the SCell, the preamble of the random access procedure in the second time resource, the preamble based on the indicated random access ID. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The actions performed by the communications manager 615, among other examples herein, may be implemented to realize one or more potential advantages. For example, communications manager 615 may increase available battery power, communication quality (e.g., via increased available resources), and decreased communication latency at a wireless device (e.g., a UE 115) by supporting aperiodic random access procedures. The increase in communication quality and decrease in latency may result in increased link performance and decreased overhead based on the aperiodic random access procedures. Accordingly, communications manager 615 may save power and increase battery life at a wireless device (e.g., a UE 115) by strategically increasing a quality of communications at a wireless device (e.g., a UE 115).

Figure 7:
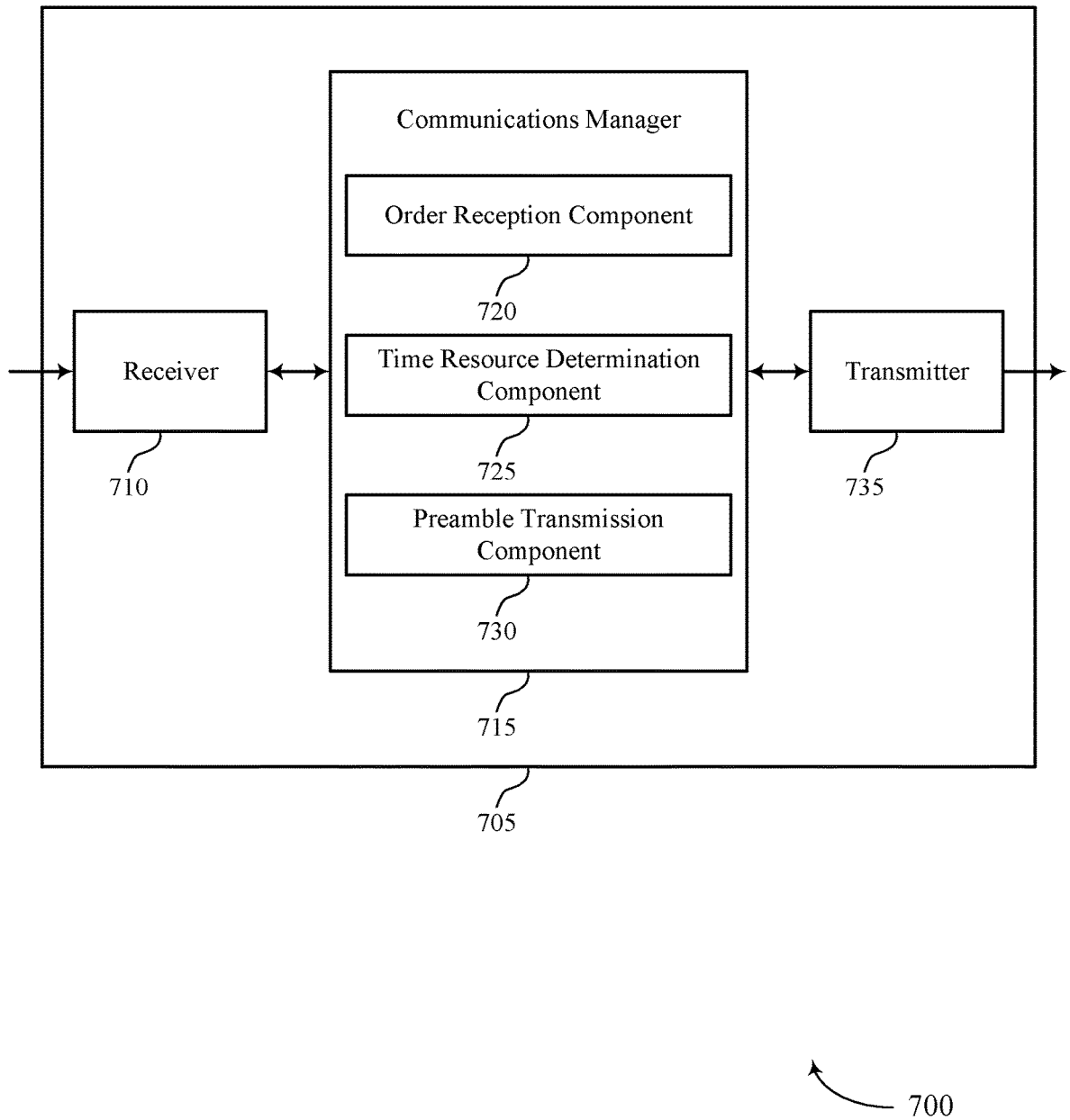

FIG. 7 shows a block diagram 700 of a device 705 that supports aperiodic random access procedures in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to aperiodic random access procedures, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an order reception component 720, a time resource determination component 725, and a preamble transmission component 730. The communications manager 715 may be an example of aspects of the communications manager 910 described herein.

The order reception component 720 may receive, from an SCell of a base station in a first time resource, an indication of an offset and a random access ID for the UE, the offset including a quantity of time resources and scheduling a random access occasion for the UE to transmit a preamble of a random access procedure for the SCell.

The time resource determination component 725 may determine, based on the received indication of the offset, a second time resource that is offset from the first time resource by the quantity of time resources.

The preamble transmission component 730 may transmit, to the SCell, the preamble of the random access procedure in the second time resource, the preamble based on the indicated random access ID.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

A processor of a wireless device (e.g., controlling the receiver 710, the transmitter 735, or the transceiver 920 as described with reference to FIG. 9) may increase available battery power, communication quality, and may decrease communication latency. The increased communication quality may increase available battery power and throughput (e.g., via implementation of system components described with reference to FIG. 8) compared to other systems and techniques, for example, that do not support aperiodic random access procedures, which may decrease communication quality and increase power consumption. Further, the processor of the wireless device may identify one or more aspects of scheduled random access resources to perform the aperiodic random access procedure. The processor of the wireless device may use the scheduled random access resources to perform one or more actions that may result in increased communication quality, as well as save power and increase battery life at the wireless device (e.g., by strategically supporting increasing communication quality by performing the aperiodic random access procedure), among other benefits.

In some cases, the order reception component 720, time resource determination component 725, and preamble transmission component 730 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the order reception component 720, time resource determination component 725, and preamble transmission component 730 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 8:
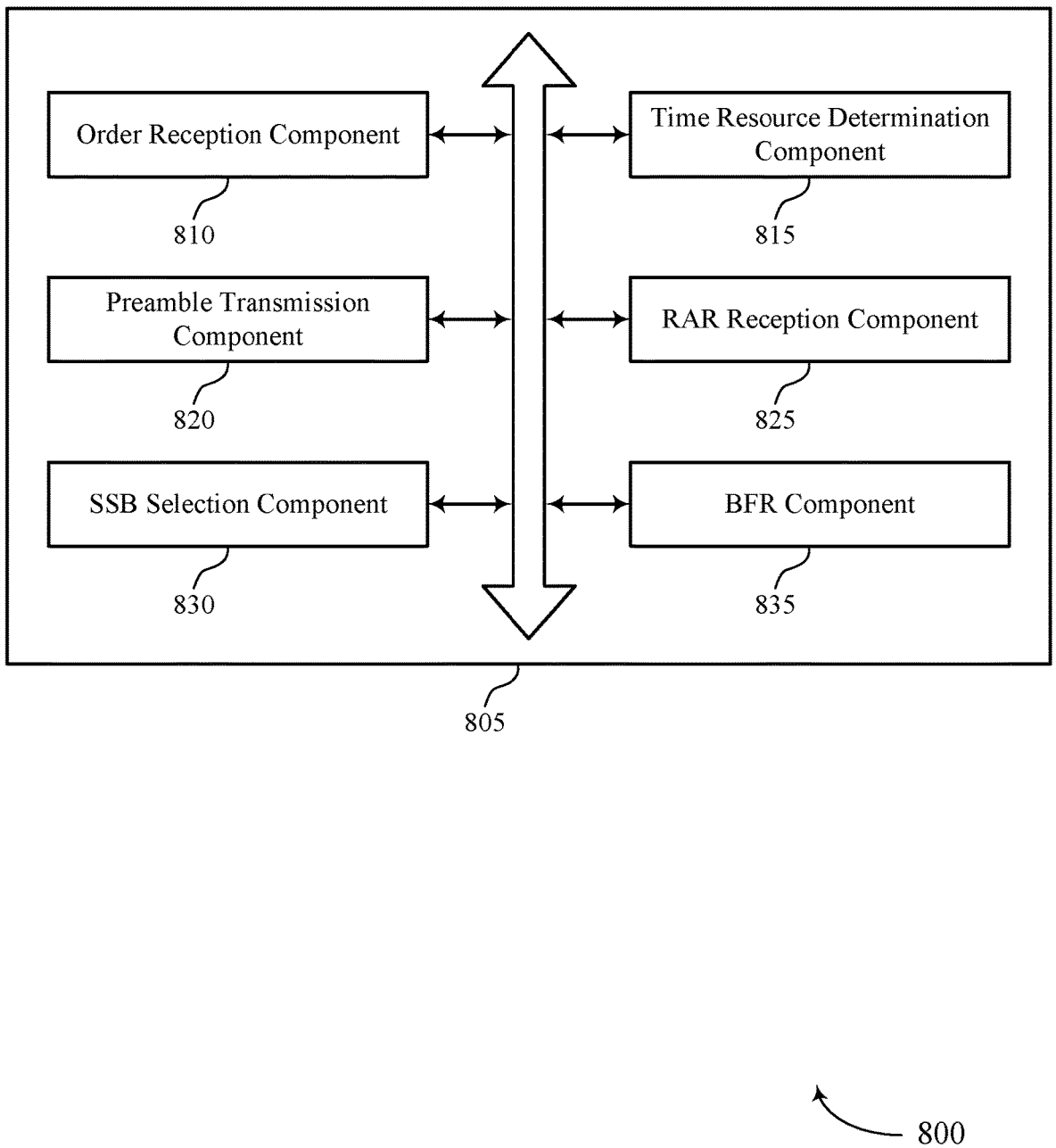
FIG. 8 shows a block diagram of a communications manager that supports aperiodic random access procedures in accordance with aspects of the present disclosure.

FIG. 8 shows a block diagram 800 of a communications manager 805 that supports aperiodic random access procedures in accordance with aspects of the present disclosure. The communications manager 805 may be an example of aspects of a communications manager 615, a communications manager 715, or a communications manager 910 described herein. The communications manager 805 may include an order reception component 810, a time resource determination component 815, a preamble transmission component 820, a RAR reception component 825, an SSB selection component 830, and a BFR component 835. Each of these modules may communicate, directly or indirectly, with one another (e.g., via one or more buses).

The order reception component 810 may receive, from an SCell of a base station in a first time resource, an indication of an offset and a random access ID for the UE, the offset including a quantity of time resources and scheduling a random access occasion for the UE to transmit a preamble of a random access procedure for the SCell. In some examples, the order reception component 810 may receive a message indicating that the UE is to perform the random access procedure for the SCell, where the indication of the offset and the random access ID are received in the message.

In some examples, the order reception component 810 may receive a DCI message indicating the UE is to perform the random access procedure for the SCell and including the indication of the offset and the random access ID. In some examples, the order reception component 810 may monitor for the indication of the offset and random access ID for the UE according to a RNTI of the UE that is associated with an SCell group that includes the SCell.

In some examples, the order reception component 810 may receive a configuration scheduling a periodic set of random access occasions for the UE to transmit a preamble of the random access procedure for a primary cell, the random access occasion for the UE to transmit the preamble of the random access procedure for the SCell different from each random access occasion of the periodic set of random access occasions for the UE to transmit the preamble of the random access procedure for the primary cell. In some cases, the indication of the offset is received via a unicast transmission from the base station. In some cases, the SCell includes a PSCell of an SCell group associated with the base station.

The time resource determination component 815 may determine, based on the received indication of the offset, a second time resource that is offset from the first time resource by the quantity of time resources. In some cases, the first time resource is a first slot and the second time resource is a second slot. In some cases, the first time resource is a first symbol period and the second time resource is a second symbol period.

The preamble transmission component 820 may transmit, to the SCell, the preamble of the random access procedure in the second time resource, the preamble based on the indicated random access ID.

The RAR reception component 825 may monitor for a response to the transmitted preamble of the random access procedure during a monitoring time duration that is based on the received indication of the offset.

The SSB selection component 830 may receive one or more SSBs from the SCell. In some examples, the SSB selection component 830 may transmit, to the primary cell, an indication of an SSB selected from the one or more SSBs of the SCell. In some examples, the SSB selection component 830 may monitor, on the SCell, for the indication of the offset and the random access ID for the UE based on transmitting the indication of the SSB, the indication of the offset and the random access ID for the UE received in response to the monitoring.

In some examples, the SSB selection component 830 may receive, from the primary cell, a configuration of the SCell. In some examples, the SSB selection component 830 may monitor, at least in part in response to receiving the configuration, for the one or more SSBs from the SCell, where the random access procedure includes a timing adjustment procedure for the SCell. In some cases, the one or more SSBs are received from the SCell, and the indication of the SSB is transmitted to the primary cell.

The BFR component 835 may transmit, to a primary cell, a link recovery request based on detecting a beam failure for a PSCell associated with the base station. In some examples, the BFR component 835 may receive, from the primary cell, an indication of uplink resources on the primary cell for performing a BFR procedure for the PSCell. In some examples, the BFR component 835 may transmit, to the primary cell on the uplink resources, a request of the BFR procedure. In some examples, the BFR component 835 may receive, from the primary cell in response to the request of the BFR procedure, an indication of a communication beam of the PSCell.

In some cases, the order reception component 810, time resource determination component 815, preamble transmission component 820, RAR reception component 825, SSB selection component 830, and BFR component 835 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the order reception component 810, time resource determination component 815, preamble transmission component 820, RAR reception component 825, SSB selection component 830, and BFR component 835 discussed herein.

Figure 9:
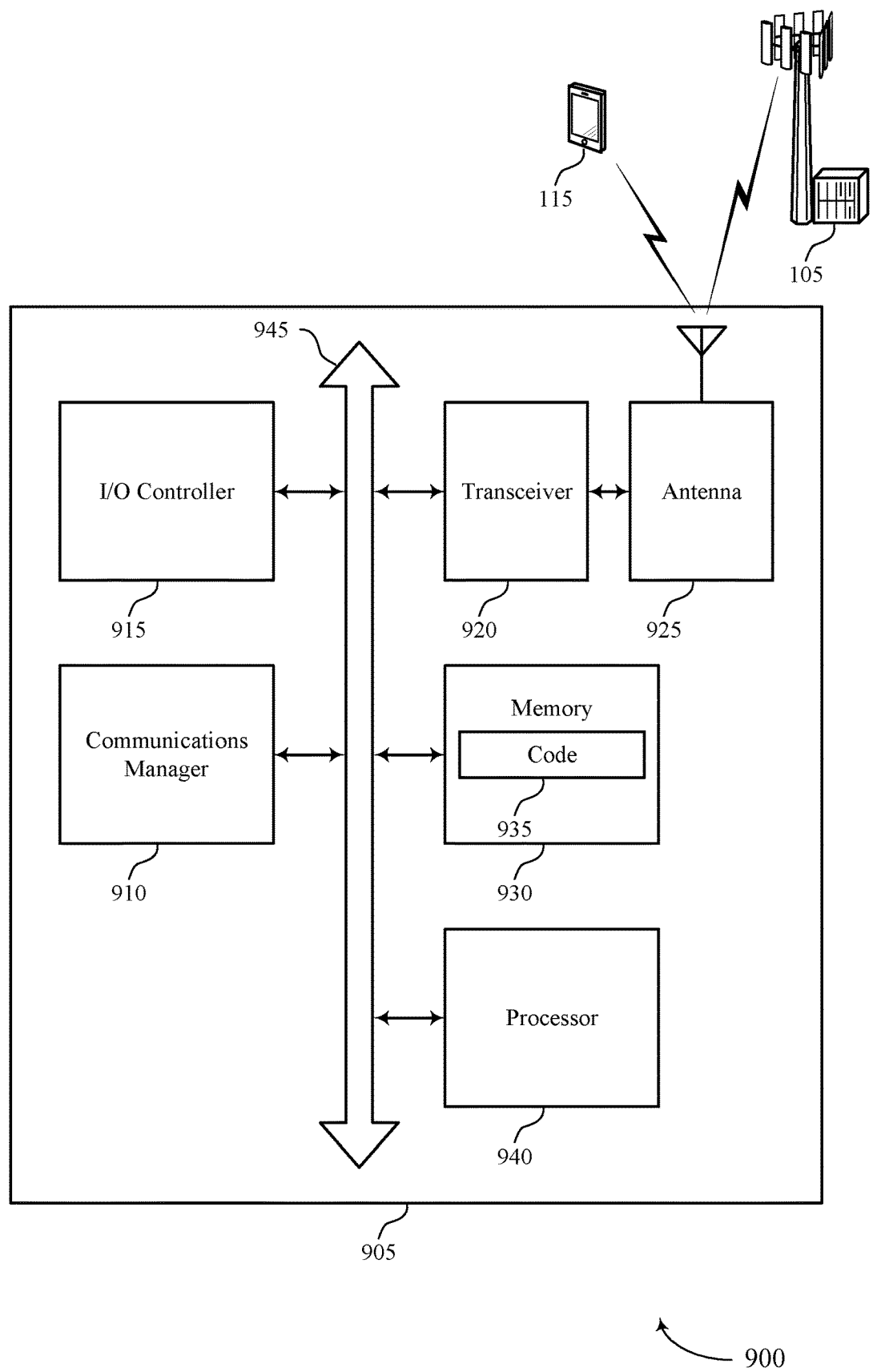
FIG. 9 shows a diagram of a system including a device that supports aperiodic random access procedures in accordance with aspects of the present disclosure.

FIG. 9 shows a diagram of a system 900 including a device 905 that supports aperiodic random access procedures in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from an SCell of a base station in a first time resource, an indication of an offset and a random access ID for the UE, the offset including a quantity of time resources and scheduling a random access occasion for the UE to transmit a preamble of a random access procedure for the SCell, determine, based on the received indication of the offset, a second time resource that is offset from the first time resource by the quantity of time resources, and transmit, to the SCell, the preamble of the random access procedure in the second time resource, the preamble based on the indicated random access ID.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting aperiodic random access procedures).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
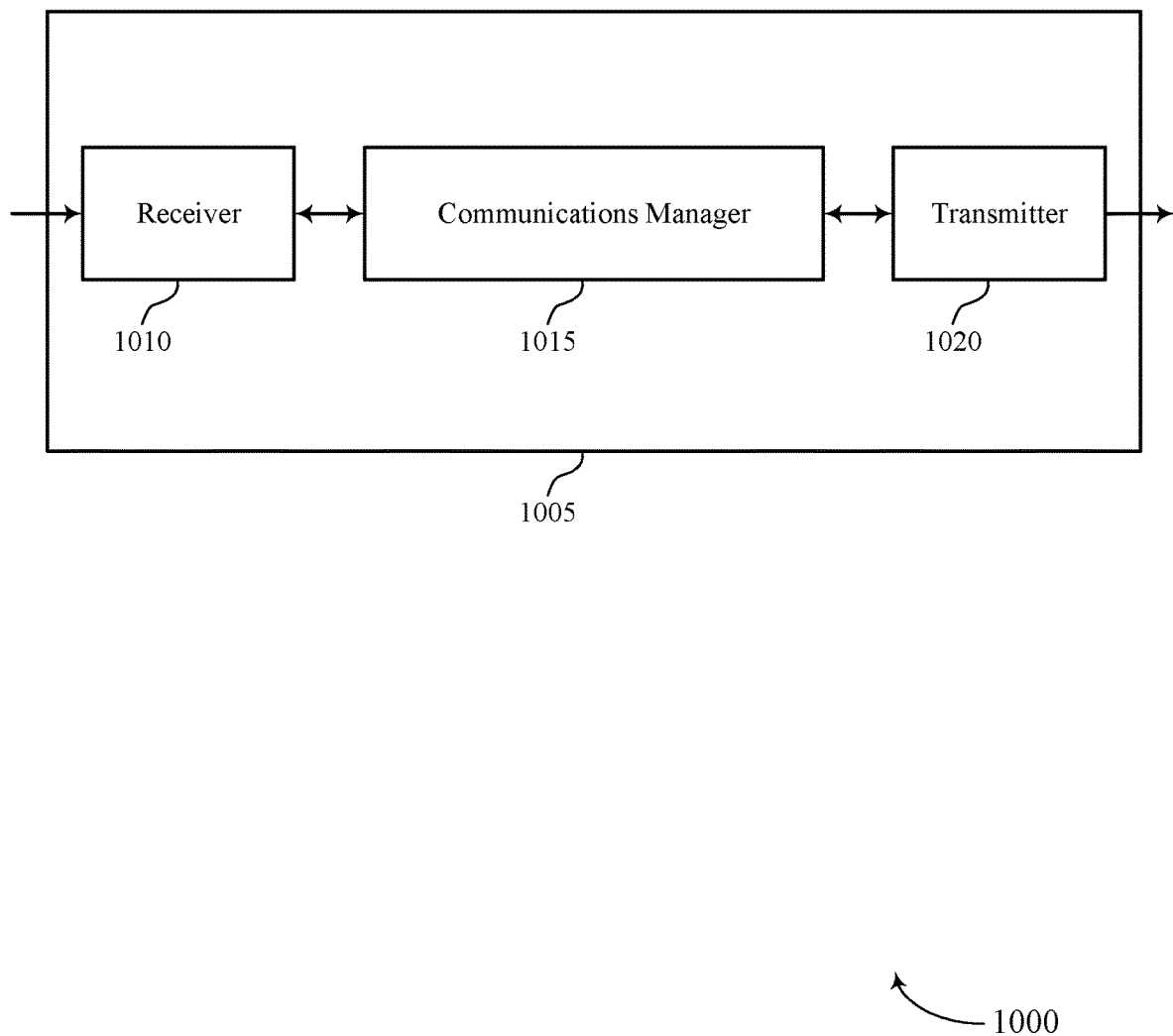
FIGS. 10 and 11 show block diagrams of devices that support aperiodic random access procedures in accordance with aspects of the present disclosure.

FIG. 10 shows a block diagram 1000 of a device 1005 that supports aperiodic random access procedures in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to aperiodic random access procedures, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE from an SCell in a first time resource, an indication of an offset and a random access ID for the UE, the offset including a quantity of time resources and scheduling a random access occasion for the UE to transmit a preamble of a random access procedure for the SCell, monitor, based on the transmitted indication of the offset, a second time resource that is offset from the first time resource by the quantity of time resources, and receive, from the UE on the SCell based on the monitoring and the indicated random access ID, the preamble of the random access procedure in the second time resource. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
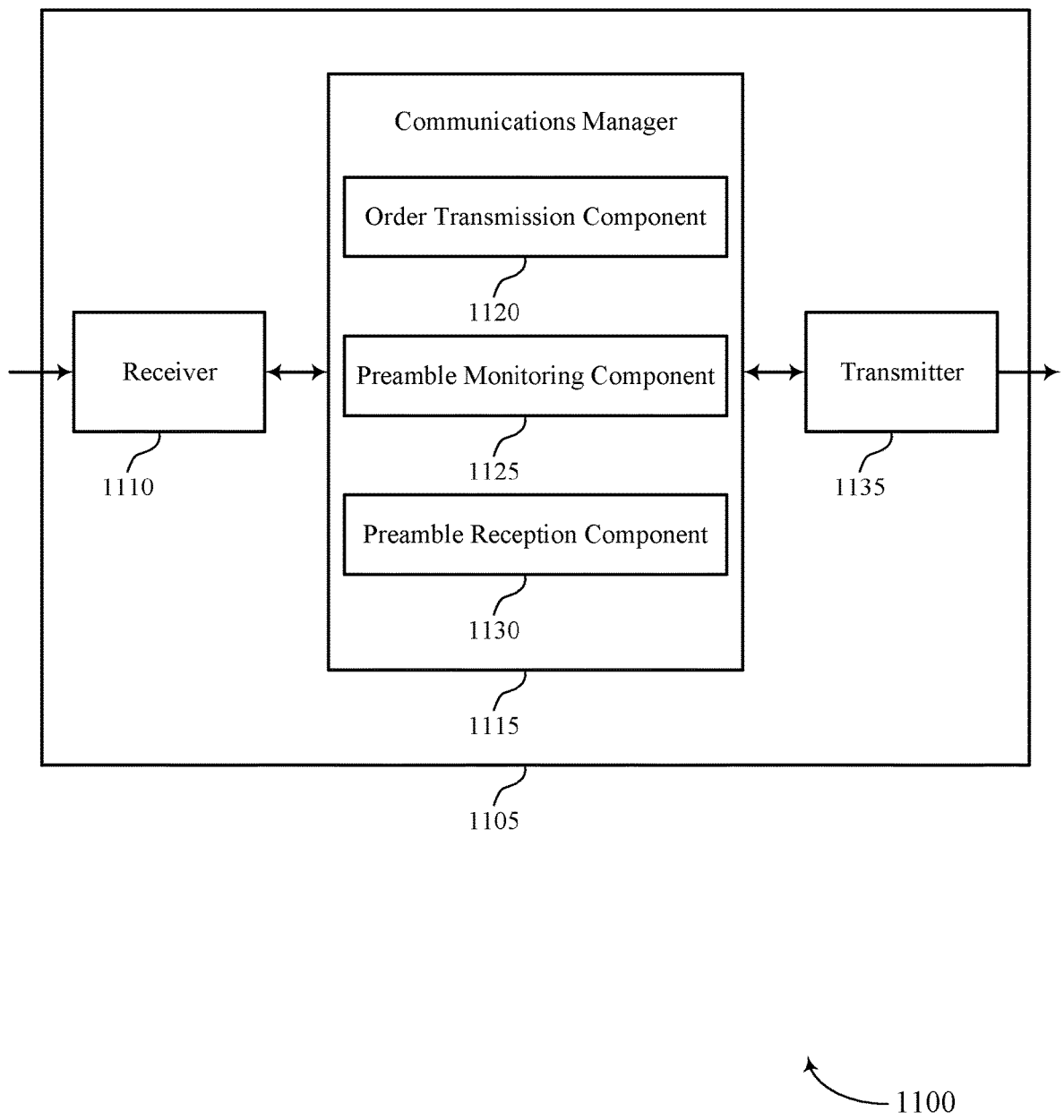

FIG. 11 shows a block diagram 1100 of a device 1105 that supports aperiodic random access procedures in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to aperiodic random access procedures, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an order transmission component 1120, a preamble monitoring component 1125, and a preamble reception component 1130. The communications manager 1115 may be an example of aspects of the communications manager 1310 described herein.

The order transmission component 1120 may transmit, to a UE from an SCell in a first time resource, an indication of an offset and a random access ID for the UE, the offset including a quantity of time resources and scheduling a random access occasion for the UE to transmit a preamble of a random access procedure for the SCell.

The preamble monitoring component 1125 may monitor, based on the transmitted indication of the offset, a second time resource that is offset from the first time resource by the quantity of time resources.

The preamble reception component 1130 may receive, from the UE on the SCell based on the monitoring and the indicated random access ID, the preamble of the random access procedure in the second time resource.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
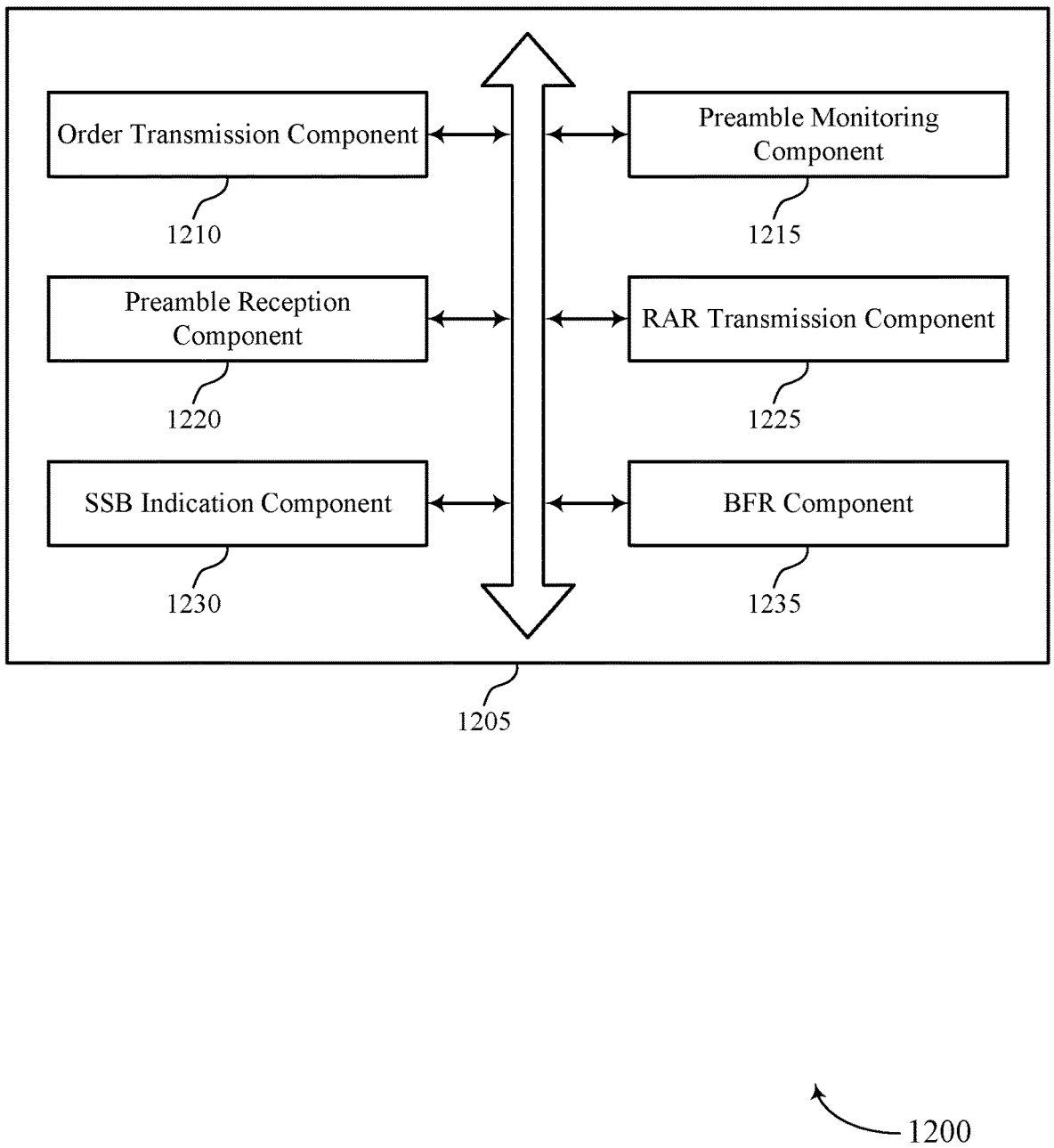
FIG. 12 shows a block diagram of a communications manager that supports aperiodic random access procedures in accordance with aspects of the present disclosure.

FIG. 12 shows a block diagram 1200 of a communications manager 1205 that supports aperiodic random access procedures in accordance with aspects of the present disclosure. The communications manager 1205 may be an example of aspects of a communications manager 1015, a communications manager 1115, or a communications manager 1310 described herein. The communications manager 1205 may include an order transmission component 1210, a preamble monitoring component 1215, a preamble reception component 1220, a RAR transmission component 1225, an SSB indication component 1230, and a BFR component 1235. Each of these modules may communicate, directly or indirectly, with one another (e.g., via one or more buses).

The order transmission component 1210 may transmit, to a UE from an SCell in a first time resource, an indication of an offset and a random access ID for the UE, the offset including a quantity of time resources and scheduling a random access occasion for the UE to transmit a preamble of a random access procedure for the SCell. In some examples, the order transmission component 1210 may transmit a message indicating that the UE is to perform the random access procedure for the SCell, where the indication of the offset and the random access ID are received in the message. In some examples, the order transmission component 1210 may transmit a DCI message indicating the UE is to perform the random access procedure for the SCell and including the indication of the offset and the random access ID.

In some examples, the order transmission component 1210 may transmit a configuration scheduling a periodic set of random access occasions for the UE to use to transmit a preamble of the random access procedure for a primary cell, the random access occasion for the UE to use to transmit the preamble of the random access procedure for the SCell different from each random access occasion of the periodic set of random access occasions for the UE to use to transmit the preamble of the random access procedure for the primary cell. In some cases, the indication of the offset is transmitted via a unicast transmission to the UE.

The preamble monitoring component 1215 may monitor, based on the transmitted indication of the offset, a second time resource that is offset from the first time resource by the quantity of time resources.

The preamble reception component 1220 may receive, from the UE on the SCell based on the monitoring and the indicated random access ID, the preamble of the random access procedure in the second time resource.

The RAR transmission component 1225 may transmit a response to the received preamble of the random access procedure during a monitoring time duration that is based on the transmitted indication of the offset.

The SSB indication component 1230 may transmit one or more SSBs from the SCell. In some examples, the SSB indication component 1230 may receive, on a primary cell, an indication of an SSB of the one or more SSBs, where the indication of the offset and the random access ID for the UE is transmitted on the SCell based on receiving the indication of the SSB.

The BFR component 1235 may receive, from the UE on a primary cell, a link recovery request for a PSCell associated with the base station. In some examples, the BFR component 1235 may transmit, to the UE on the primary cell, an indication of uplink resources on the primary cell for the UE to use to perform a BFR procedure for the PSCell. In some examples, the BFR component 1235 may receive, from the UE on the primary cell on the uplink resources, a request of the BFR procedure. In some examples, the BFR component 1235 may transmit, to the UE on the primary cell in response to the request of the BFR procedure, an indication of a communication beam of the PSCell.

Figure 13:
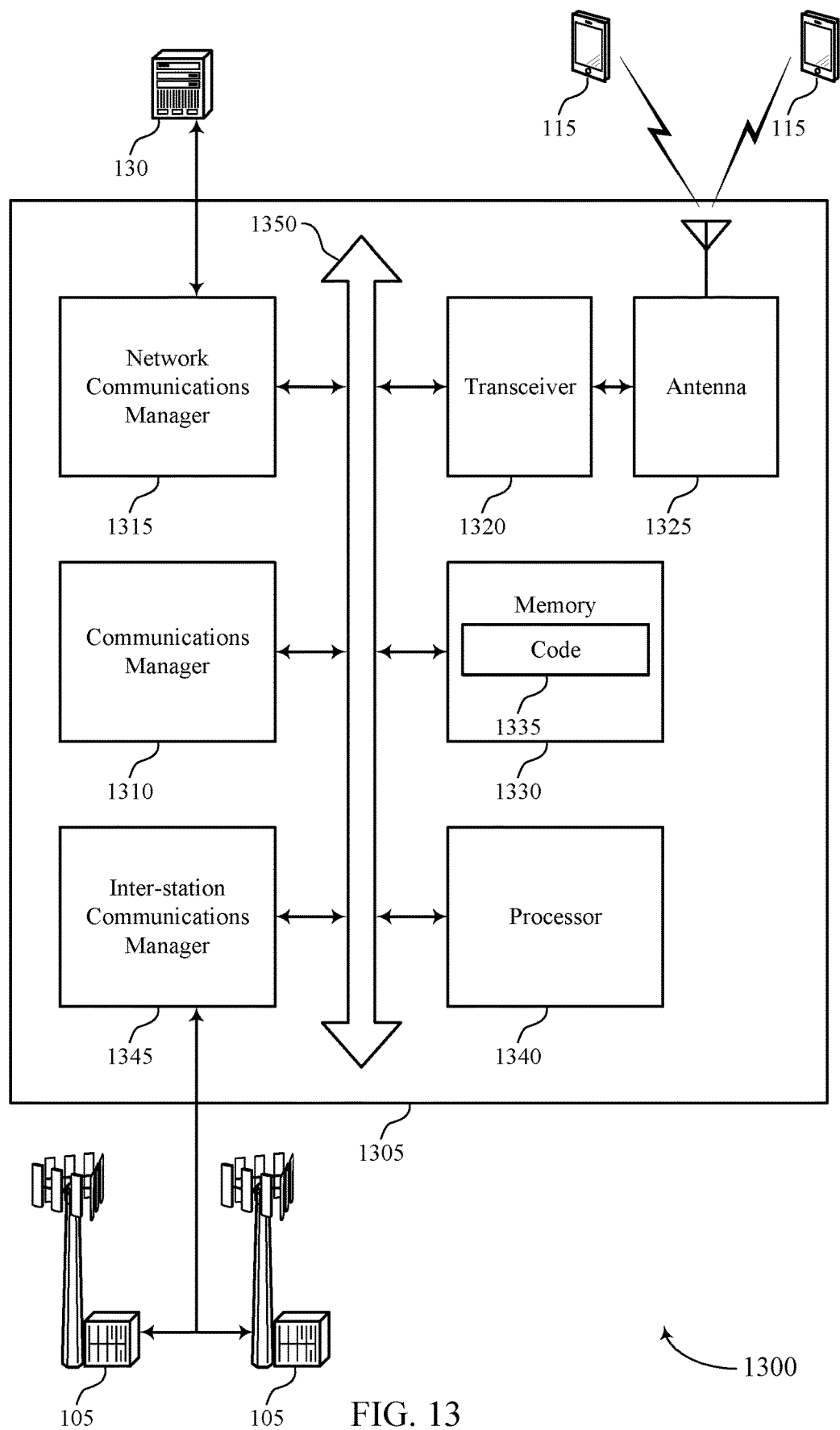
FIG. 13 shows a diagram of a system including a device that supports aperiodic random access procedures in accordance with aspects of the present disclosure.

FIG. 13 shows a diagram of a system 1300 including a device 1305 that supports aperiodic random access procedures in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE from an SCell in a first time resource, an indication of an offset and a random access ID for the UE, the offset including a quantity of time resources and scheduling a random access occasion for the UE to transmit a preamble of a random access procedure for the SCell, monitor, based on the transmitted indication of the offset, a second time resource that is offset from the first time resource by the quantity of time resources, and receive, from the UE on the SCell based on the monitoring and the indicated random access ID, the preamble of the random access procedure in the second time resource.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting aperiodic random access procedures).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
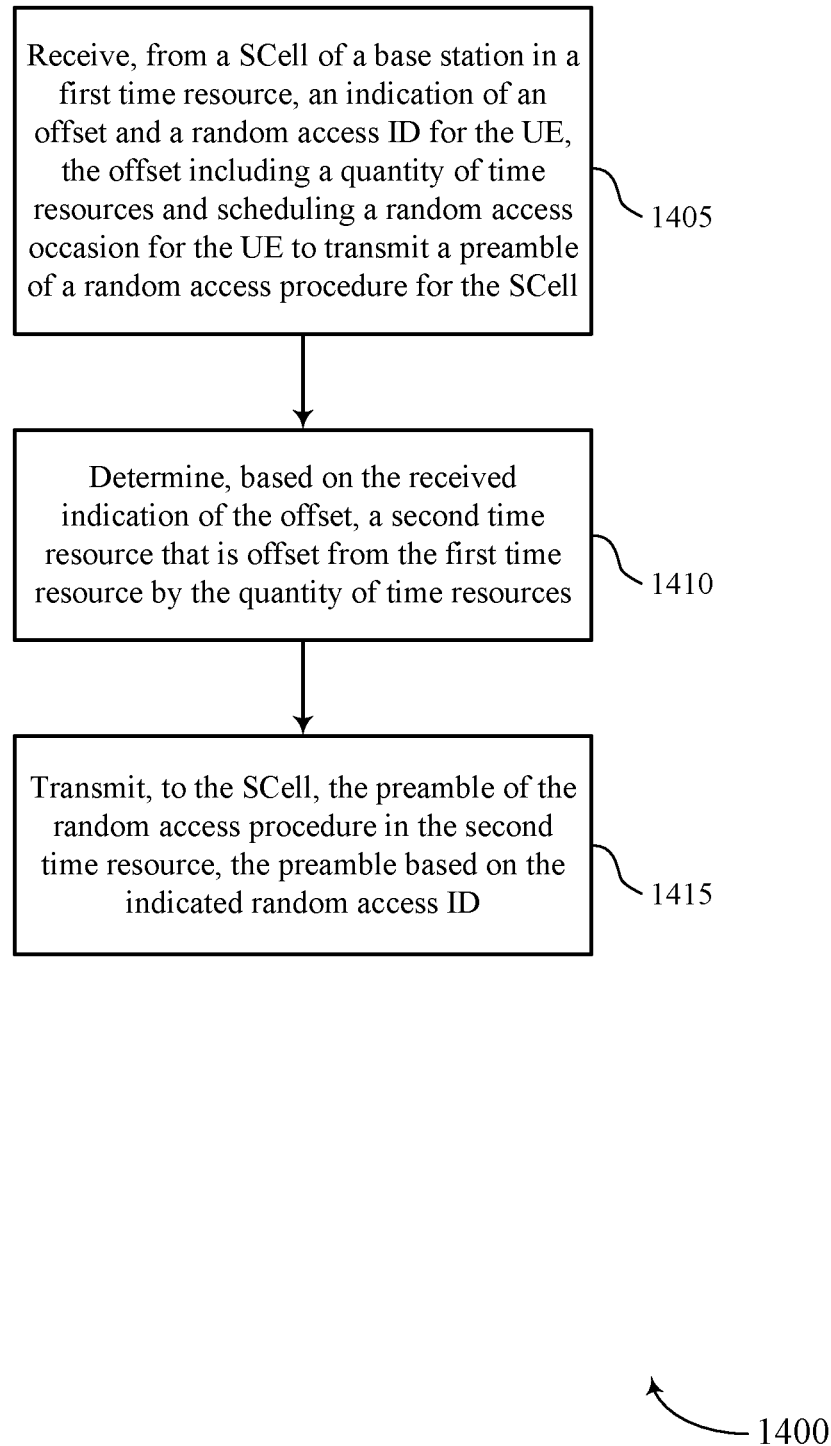
FIGS. 14 through 17 show flowcharts illustrating methods that support aperiodic random access procedures in accordance with aspects of the present disclosure.

FIG. 14 shows a flowchart illustrating a method 1400 that supports aperiodic random access procedures in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from an SCell of a base station in a first time resource, an indication of an offset and a random access ID for the UE, the offset including a quantity of time resources and scheduling a random access occasion for the UE to transmit a preamble of a random access procedure for the SCell. The operations of 1405 may be performed according to the methods described herein. In some examples, aspects of the operations of 1405 may be performed by an order reception component as described with reference to FIGS. 6 through 9.

At 1410, the UE may determine, based on the received indication of the offset, a second time resource that is offset from the first time resource by the quantity of time resources. The operations of 1410 may be performed according to the methods described herein. In some examples, aspects of the operations of 1410 may be performed by a time resource determination component as described with reference to FIGS. 6 through 9.

At 1415, the UE may transmit, to the SCell, the preamble of the random access procedure in the second time resource, the preamble based on the indicated random access ID. The operations of 1415 may be performed according to the methods described herein. In some examples, aspects of the operations of 1415 may be performed by a preamble transmission component as described with reference to FIGS. 6 through 9.

Figure 15:
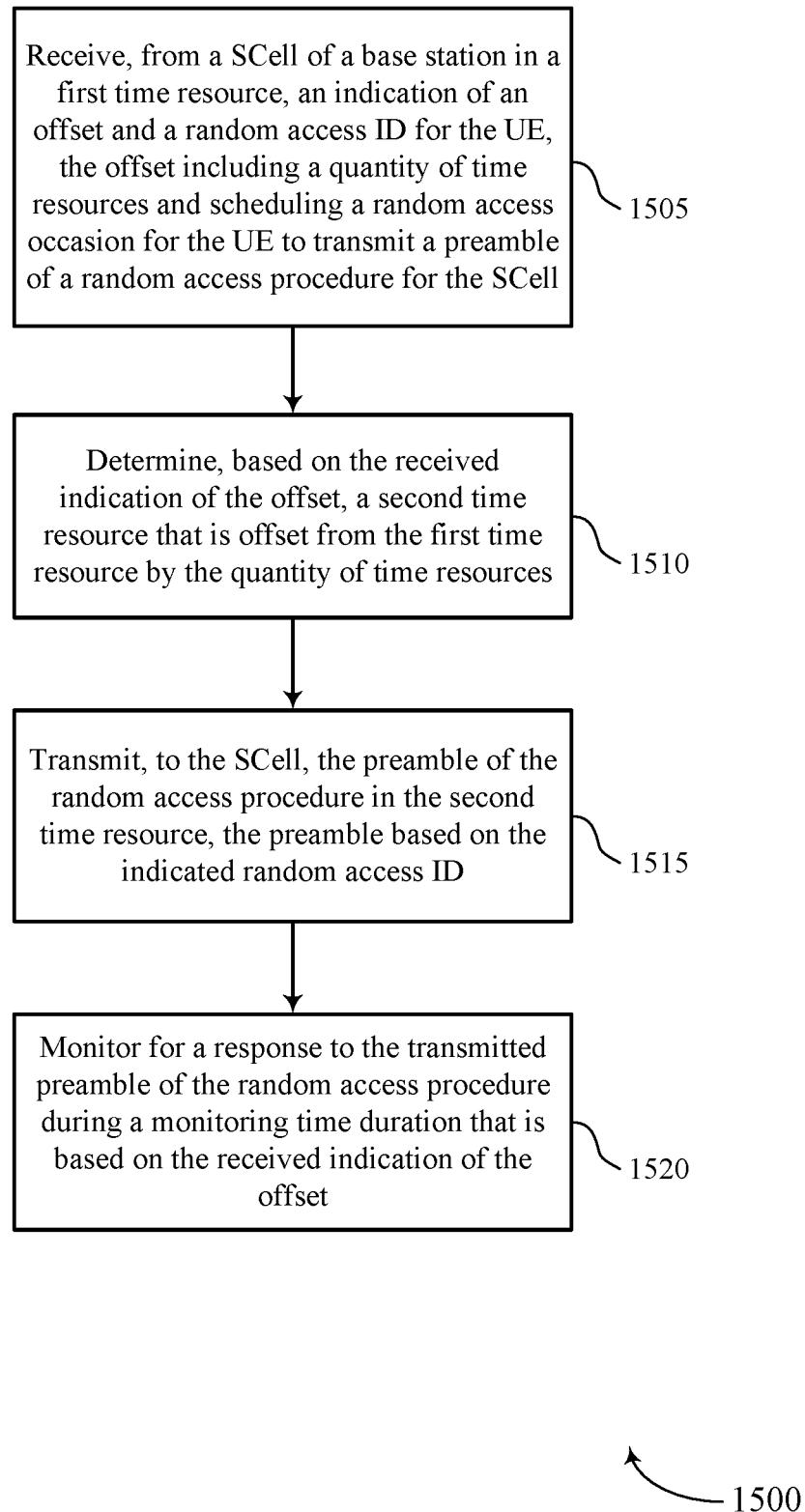

FIG. 15 shows a flowchart illustrating a method 1500 that supports aperiodic random access procedures in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from an SCell of a base station in a first time resource, an indication of an offset and a random access ID for the UE, the offset including a quantity of time resources and scheduling a random access occasion for the UE to transmit a preamble of a random access procedure for the SCell. The operations of 1505 may be performed according to the methods described herein. In some examples, aspects of the operations of 1505 may be performed by an order reception component as described with reference to FIGS. 6 through 9.

At 1510, the UE may determine, based on the received indication of the offset, a second time resource that is offset from the first time resource by the quantity of time resources. The operations of 1510 may be performed according to the methods described herein. In some examples, aspects of the operations of 1510 may be performed by a time resource determination component as described with reference to FIGS. 6 through 9.

At 1515, the UE may transmit, to the SCell, the preamble of the random access procedure in the second time resource, the preamble based on the indicated random access ID. The operations of 1515 may be performed according to the methods described herein. In some examples, aspects of the operations of 1515 may be performed by a preamble transmission component as described with reference to FIGS. 6 through 9.

At 1520, the UE may monitor for a response to the transmitted preamble of the random access procedure during a monitoring time duration that is based on the received indication of the offset. The operations of 1520 may be performed according to the methods described herein. In some examples, aspects of the operations of 1520 may be performed by a RAR reception component as described with reference to FIGS. 6 through 9.

Figure 16:
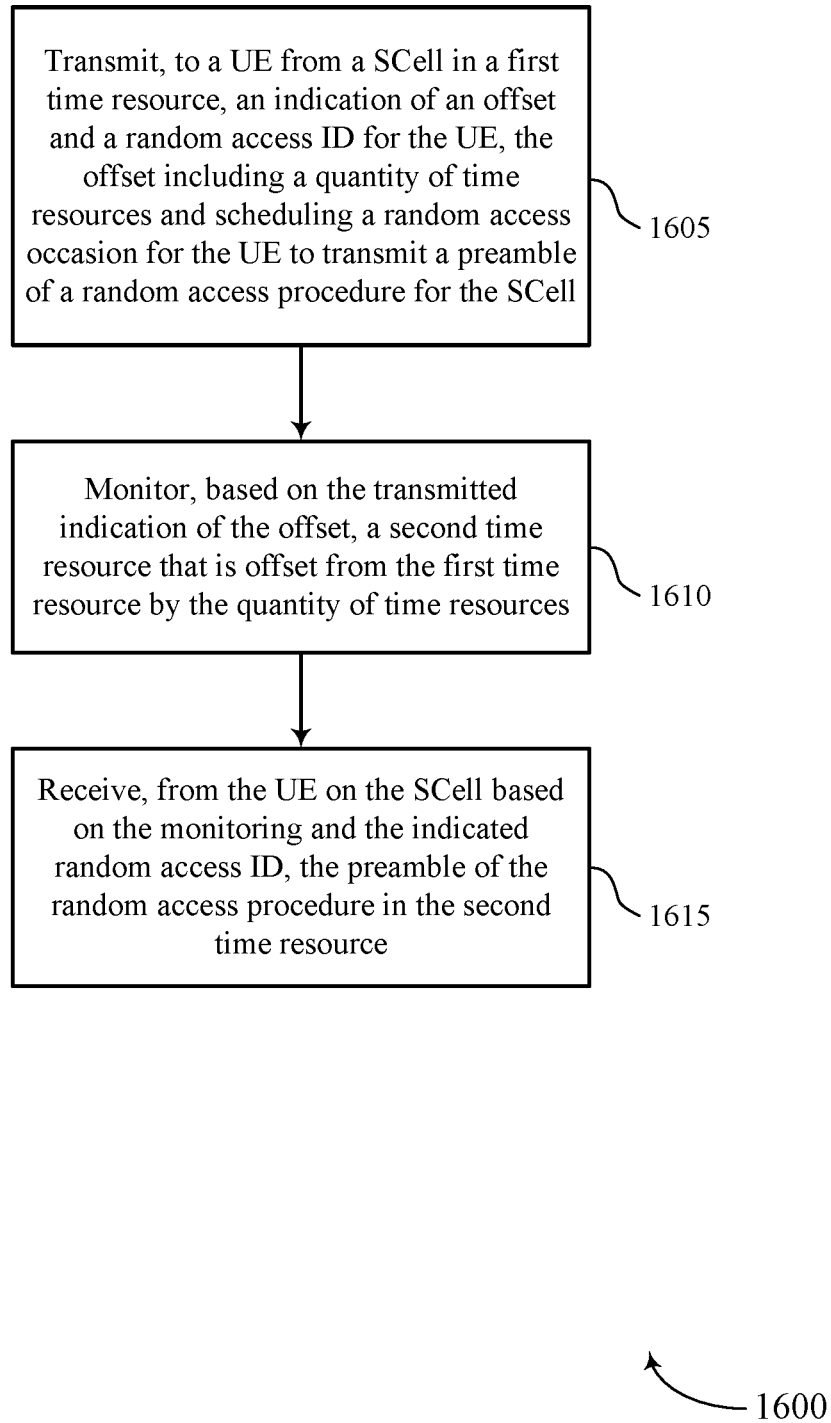

FIG. 16 shows a flowchart illustrating a method 1600 that supports aperiodic random access procedures in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE from an SCell in a first time resource, an indication of an offset and a random access ID for the UE, the offset including a quantity of time resources and scheduling a random access occasion for the UE to transmit a preamble of a random access procedure for the SCell. The operations of 1605 may be performed according to the methods described herein. In some examples, aspects of the operations of 1605 may be performed by an order transmission component as described with reference to FIGS. 10 through 13.

At 1610, the base station may monitor, based on the transmitted indication of the offset, a second time resource that is offset from the first time resource by the quantity of time resources. The operations of 1610 may be performed according to the methods described herein. In some examples, aspects of the operations of 1610 may be performed by a preamble monitoring component as described with reference to FIGS. 10 through 13.

At 1615, the base station may receive, from the UE on the SCell based on the monitoring and the indicated random access ID, the preamble of the random access procedure in the second time resource. The operations of 1615 may be performed according to the methods described herein. In some examples, aspects of the operations of 1615 may be performed by a preamble reception component as described with reference to FIGS. 10 through 13.

Figure 17:
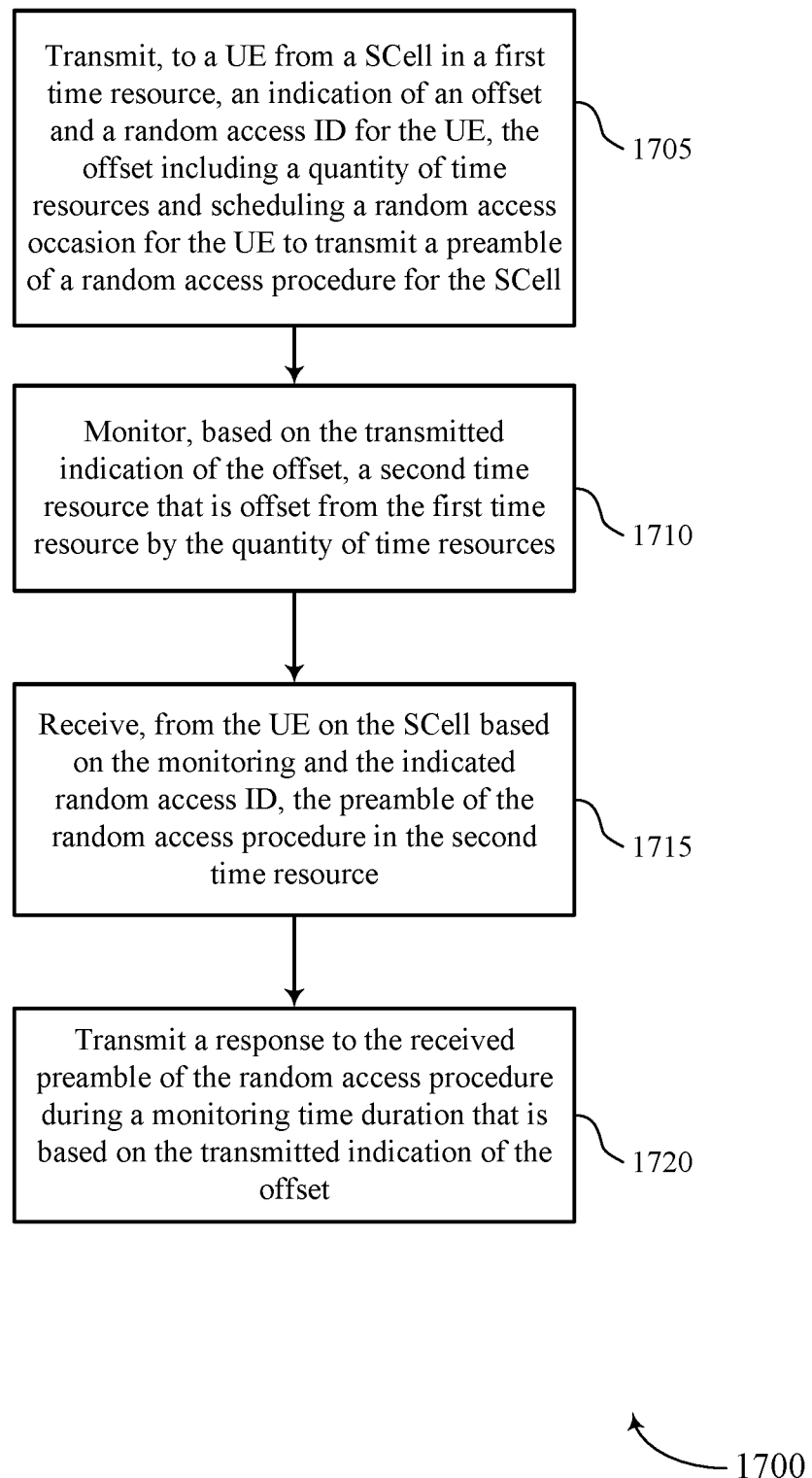

FIG. 17 shows a flowchart illustrating a method 1700 that supports aperiodic random access procedures in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE from an SCell in a first time resource, an indication of an offset and a random access ID for the UE, the offset including a quantity of time resources and scheduling a random access occasion for the UE to transmit a preamble of a random access procedure for the SCell. The operations of 1705 may be performed according to the methods described herein. In some examples, aspects of the operations of 1705 may be performed by an order transmission component as described with reference to FIGS. 10 through 13.

At 1710, the base station may monitor, based on the transmitted indication of the offset, a second time resource that is offset from the first time resource by the quantity of time resources. The operations of 1710 may be performed according to the methods described herein. In some examples, aspects of the operations of 1710 may be performed by a preamble monitoring component as described with reference to FIGS. 10 through 13.

At 1715, the base station may receive, from the UE on the SCell based on the monitoring and the indicated random access ID, the preamble of the random access procedure in the second time resource. The operations of 1715 may be performed according to the methods described herein. In some examples, aspects of the operations of 1715 may be performed by a preamble reception component as described with reference to FIGS. 10 through 13.

At 1720, the base station may transmit a response to the received preamble of the random access procedure during a monitoring time duration that is based on the transmitted indication of the offset. The operations of 1720 may be performed according to the methods described herein. In some examples, aspects of the operations of 1720 may be performed by a RAR transmission component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a SCell of a base station in a first time resource, an indication of an offset and a random access ID for the UE, the offset comprising a quantity of time resources and scheduling a random access occasion for the UE to transmit a preamble of a random access procedure for the SCell; determining, based at least in part on the received indication of the offset, a second time resource that is offset from the first time resource by the quantity of time resources; and transmitting, to the SCell, the preamble of the random access procedure in the second time resource, the preamble based at least in part on the indicated random access ID.

Aspect 2: The method of aspect 1, wherein receiving the indication of the offset and the random access ID comprises: receiving a message indicating that the UE is to perform the random access procedure for the SCell, wherein the indication of the offset and the random access ID are received in the message.

Aspect 3: The method of aspect 2, wherein receiving the message comprises: receiving a DCI message indicating the UE is to perform the random access procedure for the SCell and comprising the indication of the offset and the random access ID.

Aspect 4: The method of any of aspects 1 through 3, further comprising: monitoring for a response to the transmitted preamble of the random access procedure during a monitoring time duration that is based at least in part on the received indication of the offset.

Aspect 5: The method of any of aspects 1 through 4, further comprising: receiving one or more SSBs from the SCell; transmitting, to a primary cell, an indication of a SSB selected from the one or more SSBs of the SCell; and monitoring, on the SCell, for the indication of the offset and the random access ID for the UE based at least in part on transmitting the indication of the SSB, the indication of the offset and the random access ID for the UE received in response to the monitoring.

Aspect 6: The method of aspect 5, further comprising: receiving, from the primary cell, a configuration of the SCell; and monitoring, at least in part in response to receiving the configuration, for the one or more SSBs from the SCell, wherein the random access procedure includes a timing adjustment procedure for the SCell.

Aspect 7: The method of any of aspects 5 through 6, wherein monitoring for the indication of the offset comprises: monitoring for the indication of the offset and random access ID for the UE according to a RNTI of the UE that is associated with a SCell group that includes the SCell.

Aspect 8: The method of any of aspects 5 through 7, wherein the one or more SSBs are received from the SCell, and the indication of the SSB is transmitted to the primary cell.

Aspect 9: The method of any of aspects 1 through 8, further comprising: transmitting, to a primary cell, an LRR based at least in part on detecting a beam failure for a PSCell associated with the base station; receiving, from the primary cell, an indication of uplink resources on the primary cell for performing a BFR procedure for the PSCell; transmitting, to the primary cell on the uplink resources, a request of the BFR procedure; and receiving, from the primary cell in response to the request of the BFR procedure, an indication of a communication beam of the PSCell.

Aspect 10: The method of any of aspects 1 through 9, wherein the indication of the offset is received via a unicast transmission from the base station.

Aspect 11: The method of any of aspects 1 through 10, further comprising: receiving a configuration scheduling a periodic set of random access occasions for the UE to transmit a preamble of the random access procedure for a primary cell, the random access occasion for the UE to transmit the preamble of the random access procedure for the SCell different from each random access occasion of the periodic set of random access occasions for the UE to transmit the preamble of the random access procedure for the primary cell.

Aspect 12: The method of any of aspects 1 through 11, wherein the SCell comprises a PSCell of a SCell group associated with the base station.

Aspect 13: The method of any of aspects 1 through 12, wherein the first time resource is a first slot and the second time resource is a second slot.

Aspect 14: The method of any of aspects 1 through 13, wherein the first time resource is a first symbol period and the second time resource is a second symbol period.

Aspect 15: A method for wireless communication at a base station, comprising: transmitting, to a UE from a SCell in a first time resource, an indication of an offset and a random access ID for the UE, the offset comprising a quantity of time resources and scheduling a random access occasion for the UE to transmit a preamble of a random access procedure for the SCell; monitoring, based at least in part on the transmitted indication of the offset, a second time resource that is offset from the first time resource by the quantity of time resources; and receiving, from the UE on the SCell based at least in part on the monitoring and the indicated random access ID, the preamble of the random access procedure in the second time resource.

Aspect 16: The method of aspect 15, wherein transmitting the indication of the offset and the random access ID comprises: transmitting a message indicating that the UE is to perform the random access procedure for the SCell, wherein the indication of the offset and the random access ID are received in the message.

Aspect 17: The method of aspect 16, wherein transmitting the message comprises: transmitting a DCI message indicating the UE is to perform the random access procedure for the SCell and comprising the indication of the offset and the random access ID.

Aspect 18: The method of any of aspects 15 through 17, further comprising: transmitting a response to the received preamble of the random access procedure during a monitoring time duration that is based at least in part on the transmitted indication of the offset.

Aspect 19: The method of any of aspects 15 through 18, further comprising: transmitting one or more SSBs from the SCell; and receiving, on a primary cell, an indication of a SSB of the one or more SSBs, wherein the indication of the offset and the random access ID for the UE is transmitted on the SCell based at least in part on receiving the indication of the SSB.

Aspect 20: The method of any of aspects 15 through 19, further comprising: receiving, from the UE on a primary cell, an LRR for a PSCell associated with the base station; transmitting, to the UE on the primary cell, an indication of uplink resources on the primary cell for the UE to use to perform a BFR procedure for the PSCell; receiving, from the UE on the primary cell on the uplink resources, a request of the BFR procedure; and transmitting, to the UE on the primary cell in response to the request of the BFR procedure, an indication of a communication beam of the PSCell.

Aspect 21: The method of any of aspects 15 through 20, wherein the indication of the offset is transmitted via a unicast transmission to the UE.

Aspect 22: The method of any of aspects 15 through 21, further comprising: transmitting a configuration scheduling a periodic set of random access occasions for the UE to use to transmit a preamble of the random access procedure for a primary cell, the random access occasion for the UE to use to transmit the preamble of the random access procedure for the SCell different from each random access occasion of the periodic set of random access occasions for the UE to use to transmit the preamble of the random access procedure for the primary cell.

Aspect 23: An apparatus for wireless communication at a UE, comprising a processor; memory coupled with the processor; and instructions stored in the memory and executable by the processor to cause the apparatus to perform a method of any of aspects 1 through 14.

Aspect 24: An apparatus for wireless communication at a UE, comprising at least one means for performing a method of any of aspects 1 through 14.

Aspect 25: A non-transitory computer-readable medium storing code for wireless communication at a UE, the code comprising instructions executable by a processor to perform a method of any of aspects 1 through 14.

Aspect 26: An apparatus for wireless communication at a base station, comprising a processor; memory coupled with the processor; and instructions stored in the memory and executable by the processor to cause the apparatus to perform a method of any of aspects 15 through 22.

Aspect 27: An apparatus for wireless communication at a base station, comprising at least one means for performing a method of any of aspects 15 through 22.

Aspect 28: A non-transitory computer-readable medium storing code for wireless communication at a base station, the code comprising instructions executable by a processor to perform a method of any of aspects 15 through 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A"s may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving, from a secondary cell of a base station in a first time resource, an indication of an offset and a random access identifier for the UE, the offset comprising a quantity of time resources and scheduling a random access occasion for the UE to transmit a preamble of a random access procedure for the secondary cell;
determining, based at least in part on the received indication of the offset, a second time resource that is offset from the first time resource by the quantity of time resources; and
transmitting, to the secondary cell, the preamble of the random access procedure in the second time resource, the preamble based at least in part on the indicated random access identifier.

2. The method of claim 1, wherein receiving the indication of the offset and the random access identifier comprises:
receiving a message indicating that the UE is to perform the random access procedure for the secondary cell, wherein the indication of the offset and the random access identifier are received in the message.

3. The method of claim 2, wherein receiving the message comprises:
receiving a downlink control information message indicating the UE is to perform the random access procedure for the secondary cell and comprising the indication of the offset and the random access identifier.

4. The method of claim 1, further comprising:
monitoring for a response to the transmitted preamble of the random access procedure during a monitoring time duration that is based at least in part on the received indication of the offset.

5. The method of claim 1, further comprising:
receiving one or more synchronization signal blocks from the secondary cell;
transmitting, to a primary cell, an indication of a synchronization signal block selected from the one or more synchronization signal blocks of the secondary cell; and
monitoring, on the secondary cell, for the indication of the offset and the random access identifier for the UE based at least in part on transmitting the indication of the synchronization signal block, the indication of the offset and the random access identifier for the UE received in response to the monitoring.

6. The method of claim 5, further comprising:
receiving, from the primary cell, a configuration of the secondary cell; and
monitoring, at least in part in response to receiving the configuration, for the one or more synchronization signal blocks from the secondary cell, wherein the random access procedure includes a timing adjustment procedure for the secondary cell.

7. The method of claim 5, wherein monitoring for the indication of the offset comprises:
monitoring for the indication of the offset and random access identifier for the UE according to a radio network temporary identifier of the UE that is associated with a secondary cell group that includes the secondary cell.

8. The method of claim 5, wherein the one or more synchronization signal blocks are received from the secondary cell, and the indication of the synchronization signal block is transmitted to the primary cell.

9. The method of claim 1, further comprising:
transmitting, to a primary cell, a link recovery request based at least in part on detecting a beam failure for a primary secondary cell associated with the base station;
receiving, from the primary cell, an indication of uplink resources on the primary cell for performing a beam failure recovery procedure for the primary secondary cell;
transmitting, to the primary cell on the uplink resources, a request of the beam failure recovery procedure; and
receiving, from the primary cell in response to the request of the beam failure recovery procedure, an indication of a communication beam of the primary secondary cell.

10. The method of claim 1, wherein the indication of the offset is received via a unicast transmission from the base station.

11. The method of claim 1, further comprising:
receiving a configuration scheduling a periodic set of random access occasions for the UE to transmit a preamble of the random access procedure for a primary cell, the random access occasion for the UE to transmit the preamble of the random access procedure for the secondary cell different from each random access occasion of the periodic set of random access occasions for the UE to transmit the preamble of the random access procedure for the primary cell.

12. The method of claim 1, wherein the secondary cell comprises a primary secondary cell of a secondary cell group associated with the base station.

13. The method of claim 1, wherein the first time resource is a first slot and the second time resource is a second slot.

14. The method of claim 1, wherein the first time resource is a first symbol period and the second time resource is a second symbol period.

15. A method for wireless communication at a base station, comprising:
    transmitting, to a user equipment (UE) from a secondary cell in a first time resource, an indication of an offset and a random access identifier for the UE, the offset comprising a quantity of time resources and scheduling a random access occasion for the UE to transmit a preamble of a random access procedure for the secondary cell;
    monitoring, based at least in part on the transmitted indication of the offset, a second time resource that is offset from the first time resource by the quantity of time resources; and
    receiving, from the UE on the secondary cell based at least in part on the monitoring and the indicated random access identifier, the preamble of the random access procedure in the second time resource.

16. The method of claim 15, wherein transmitting the indication of the offset and the random access identifier comprises:
    transmitting a message indicating that the UE is to perform the random access procedure for the secondary cell, wherein the indication of the offset and the random access identifier are received in the message.

17. The method of claim 16, wherein transmitting the message comprises:
    transmitting a downlink control information message indicating the UE is to perform the random access procedure for the secondary cell and comprising the indication of the offset and the random access identifier.

18. The method of claim 15, further comprising:
    transmitting a response to the received preamble of the random access procedure during a monitoring time duration that is based at least in part on the transmitted indication of the offset.

19. The method of claim 15, further comprising:
    transmitting one or more synchronization signal blocks from the secondary cell; and
    receiving, on a primary cell, an indication of a synchronization signal block of the one or more synchronization signal blocks, wherein the indication of the offset and the random access identifier for the UE is transmitted on the secondary cell based at least in part on receiving the indication of the synchronization signal block.

20. The method of claim 15, further comprising:
    receiving, from the UE on a primary cell, a link recovery request for a primary secondary cell associated with the base station;
    transmitting, to the UE on the primary cell, an indication of uplink resources on the primary cell for the UE to use to perform a beam failure recovery procedure for the primary secondary cell;
    receiving, from the UE on the primary cell on the uplink resources, a request of the beam failure recovery procedure; and
    transmitting, to the UE on the primary cell in response to the request of the beam failure recovery procedure, an indication of a communication beam of the primary secondary cell.

21. The method of claim 15, wherein the indication of the offset is transmitted via a unicast transmission to the UE.

22. The method of claim 15, further comprising:
    transmitting a configuration scheduling a periodic set of random access occasions for the UE to use to transmit a preamble of the random access procedure for a primary cell, the random access occasion for the UE to use to transmit the preamble of the random access procedure for the secondary cell different from each random access occasion of the periodic set of random access occasions for the UE to use to transmit the preamble of the random access procedure for the primary cell.

23. An apparatus for wireless communication at a user equipment (UE), comprising:
    a processor;
    memory coupled with the processor; and
    instructions stored in the memory and executable by the processor to cause the apparatus to:
        receive, from a secondary cell of a base station in a first time resource, an indication of an offset and a random access identifier for the UE, the offset comprising a quantity of time resources and scheduling a random access occasion for the UE to transmit a preamble of a random access procedure for the secondary cell;
        determine, based at least in part on the received indication of the offset, a second time resource that is offset from the first time resource by the quantity of time resources; and
        transmit, to the secondary cell, the preamble of the random access procedure in the second time resource, the preamble based at least in part on the indicated random access identifier.

24. The apparatus of claim 23, wherein the instructions are further executable by the processor to receive the indication of the offset and the random access identifier by being executable by the processor to:
    receive a message indicating that the UE is to perform the random access procedure for the secondary cell, wherein the indication of the offset and the random access identifier are received in the message.

25. The apparatus of claim 24, wherein the instructions are further executable by the processor to receive the message by being executable by the processor to:
    receive a downlink control information message indicating the UE is to perform the random access procedure for the secondary cell and comprising the indication of the offset and the random access identifier.

26. The apparatus of claim 23, wherein the instructions are further executable by the processor to cause the apparatus to:
    monitor for a response to the transmitted preamble of the random access procedure during a monitoring time duration that is based at least in part on the received indication of the offset.

27. The apparatus of claim 23, wherein the instructions are further executable by the processor to cause the apparatus to:

receive one or more synchronization signal blocks from the secondary cell;

transmit, to a primary cell, an indication of a synchronization signal block selected from the one or more synchronization signal blocks of the secondary cell; and monitor, on the secondary cell, for the indication of the offset and the random access identifier for the UE based at least in part on transmitting the indication of the synchronization signal block, the indication of the offset and the random access identifier for the UE received in response to the monitoring.

28. The apparatus of claim 23, wherein the instructions are further executable by the processor to cause the apparatus to:

transmit, to a primary cell, a link recovery request based at least in part on detecting a beam failure for a primary secondary cell associated with the base station;

receive, from the primary cell, an indication of uplink resources on the primary cell for performing a beam failure recovery procedure for the primary secondary cell;

transmit, to the primary cell on the uplink resources, a request of the beam failure recovery procedure; and receive, from the primary cell in response to the request of the beam failure recovery procedure, an indication of a communication beam of the primary secondary cell.

29. The apparatus of claim 23, wherein the indication of the offset is received via a unicast transmission from the base station.

30. An apparatus for wireless communication at a base station, comprising:

a processor;

memory coupled with the processor; and instructions stored in the memory and executable by the processor to cause the apparatus to:

transmit, to a user equipment (UE) from a secondary cell in a first time resource, an indication of an offset and a random access identifier for the UE, the offset comprising a quantity of time resources and scheduling a random access occasion for the UE to transmit a preamble of a random access procedure for the secondary cell;

monitor, based at least in part on the transmitted indication of the offset, a second time resource that is offset from the first time resource by the quantity of time resources; and receive, from the UE on the secondary cell based at least in part on the monitoring and the indicated random access identifier, the preamble of the random access procedure in the second time resource.

* * * * *